United States Patent
Zuolo et al.

(10) Patent No.: US 12,493,778 B2
(45) Date of Patent: Dec. 9, 2025

(54) METHOD AND APPARATUS FOR PERFORMING A NEURAL NETWORK OPERATION

(71) Applicant: Microchip Technology Inc., Chandler, AZ (US)

(72) Inventors: Lorenzo Zuolo, Lusia (IT); Rino Micheloni, Turate (IT)

(73) Assignee: Microchip Technology Inc., Chandler, AZ (US)

( * ) Notice: Subject to any disclaimer, the term of this patent is extended or adjusted under 35 U.S.C. 154(b) by 1040 days.

(21) Appl. No.: 17/347,388

(22) Filed: Jun. 14, 2021

(65) Prior Publication Data

US 2022/0188604 A1     Jun. 16, 2022

Related U.S. Application Data

(60) Provisional application No. 63/125,966, filed on Dec. 15, 2020.

(51) Int. Cl.
*G06N 3/063* (2023.01)
*G06F 7/50* (2006.01)
(Continued)

(52) U.S. Cl.
CPC .............. *G06N 3/063* (2013.01); *G06F 7/50* (2013.01); *G06F 7/523* (2013.01); *G06N 3/048* (2023.01); *G06F 7/5443* (2013.01)

(58) Field of Classification Search
None
See application file for complete search history.

(56) References Cited

U.S. PATENT DOCUMENTS

| 6,119,260 A | 9/2000 | Tomisawa et al. |
| 6,567,313 B2 | 5/2003 | Tanaka et al. |

(Continued)

FOREIGN PATENT DOCUMENTS

| WO | 2020152296 A1 | 7/2020 |
| WO | 2020117348 A3 | 12/2020 |

OTHER PUBLICATIONS

Anonymous, "Training checkpoints | TensorFlow Core", Dec. 28, 2019, XP055886114, p. 1-p. 8, Retrieved from the Internet.
(Continued)

*Primary Examiner* — Kamran Afshar
*Assistant Examiner* — Kurt Nicholas Pressly
(74) *Attorney, Agent, or Firm* — Glass & Associates; Kenneth Glass

(57) ABSTRACT

A method for performing a neural network operation includes receiving weight and bias values of a deep neural network (DNN). An array of feature values, a bias value and a set of weight values for a single layer of the DNN are coupled to a neural network engine. Multiply-and-accumulate operations are performed on the single layer at one or more multiply and accumulate circuit (MAC) to obtain a sum corresponding to each neuron in the single layer. A layer output value corresponding to each neuron in the single layer is coupled to a corresponding input of the MAC. The coupling a bias value and a set of weight values, the performing multiply-and-accumulate operations and the coupling a layer output value are repeated to generate an output-layer-sum corresponding to each output-layer neuron and an activation function is performed on each output-layer-sum to generate DNN output values.

10 Claims, 10 Drawing Sheets

(51) Int. Cl.
    *G06F 7/523*     (2006.01)
    *G06N 3/048*     (2023.01)
    *G06F 7/544*     (2006.01)

(56) References Cited

U.S. PATENT DOCUMENTS

| | | |
|---|---|---|
| 6,704,871 B1 | 3/2004 | Kaplan et al. |
| 7,529,215 B2 | 5/2009 | Osterling et al. |
| 7,650,480 B2 | 1/2010 | Jiang |
| 7,930,623 B2 | 4/2011 | Pisek et al. |
| 8,429,325 B1 | 4/2013 | Onufryk et al. |
| 8,621,318 B1 | 12/2013 | Micheloni et al. |
| 8,656,257 B1 | 2/2014 | Micheloni et al. |
| 8,665,648 B2 | 3/2014 | Mun et al. |
| 8,689,074 B1 | 4/2014 | Tai |
| 8,694,849 B1 | 4/2014 | Micheloni et al. |
| 8,694,855 B1 | 4/2014 | Micheloni et al. |
| 8,707,122 B1 | 4/2014 | Micheloni et al. |
| 8,769,380 B1 | 7/2014 | Burd et al. |
| 8,966,335 B2 | 2/2015 | Lunelli et al. |
| 8,971,112 B2 | 3/2015 | Crippa et al. |
| 8,984,376 B1 | 3/2015 | Norrie |
| 8,990,661 B1 | 3/2015 | Micheloni et al. |
| 9,021,333 B1 | 4/2015 | Northcott |
| 9,092,353 B1 | 7/2015 | Micheloni et al. |
| 9,128,858 B1 | 9/2015 | Micheloni et al. |
| 9,235,467 B2 | 1/2016 | Micheloni et al. |
| 9,251,909 B1 | 2/2016 | Camp et al. |
| 9,268,531 B1 | 2/2016 | Woo et al. |
| 9,292,428 B2 | 3/2016 | Kanamori et al. |
| 9,305,661 B2 | 4/2016 | Micheloni et al. |
| 9,397,701 B1 | 7/2016 | Micheloni et al. |
| 9,417,804 B2 | 8/2016 | Micheloni et al. |
| 9,444,655 B2 | 9/2016 | Sverdlov et al. |
| 9,448,881 B1 | 9/2016 | Micheloni et al. |
| 9,450,610 B1 | 9/2016 | Micheloni et al. |
| 9,454,414 B2 | 9/2016 | Micheloni et al. |
| 9,564,922 B1 | 2/2017 | Graumann et al. |
| 9,590,656 B2 | 3/2017 | Micheloni et al. |
| 9,747,200 B1 | 8/2017 | Micheloni |
| 9,799,405 B1 | 10/2017 | Micheloni et al. |
| 9,813,080 B1 | 11/2017 | Micheloni et al. |
| 9,886,214 B2 | 2/2018 | Micheloni et al. |
| 9,892,794 B2 | 2/2018 | Micheloni et al. |
| 9,899,092 B2 | 2/2018 | Micheloni |
| 10,152,273 B2 | 12/2018 | Micheloni et al. |
| 10,157,677 B2 | 12/2018 | Marelli et al. |
| 10,216,422 B2 | 2/2019 | Kim et al. |
| 10,230,396 B1 | 3/2019 | Micheloni et al. |
| 10,283,215 B2 | 5/2019 | Marelli et al. |
| 10,291,263 B2 | 5/2019 | Marelli et al. |
| 10,332,613 B1 | 6/2019 | Micheloni et al. |
| 10,490,288 B1 | 11/2019 | Wang et al. |
| 10,861,562 B1 | 12/2020 | Xiong et al. |
| 11,398,291 B2 | 7/2022 | Zuolo et al. |
| 11,514,994 B1 | 11/2022 | Zuolo et al. |
| 11,886,989 B2 | 1/2024 | Gu et al. |
| 2002/0144210 A1 | 10/2002 | Borkenhagen et al. |
| 2006/0106743 A1 | 5/2006 | Horvitz |
| 2006/0161830 A1 | 7/2006 | Yedidia et al. |
| 2006/0282603 A1 | 12/2006 | Onufryk et al. |
| 2007/0076873 A1 | 4/2007 | Yamamoto et al. |
| 2007/0157064 A1 | 7/2007 | Falik et al. |
| 2011/0231731 A1 | 9/2011 | Gross et al. |
| 2011/0255453 A1 | 10/2011 | Roh et al. |
| 2012/0166714 A1 | 6/2012 | Mun et al. |
| 2012/0287719 A1 | 11/2012 | Mun et al. |
| 2013/0343495 A1 | 12/2013 | Han et al. |
| 2014/0040697 A1 | 2/2014 | Loewenstein |
| 2014/0146605 A1 | 5/2014 | Yang |
| 2014/0237313 A1 | 8/2014 | Wang et al. |
| 2014/0281800 A1 | 9/2014 | Micheloni et al. |
| 2014/0281823 A1 | 9/2014 | Micheloni et al. |
| 2014/0310534 A1 | 10/2014 | Gurgi et al. |
| 2015/0033037 A1 | 1/2015 | Lidman |
| 2015/0049548 A1 | 2/2015 | Park et al. |
| 2015/0100860 A1 | 4/2015 | Lee et al. |
| 2016/0072527 A1 | 3/2016 | Suzuki et al. |
| 2016/0124679 A1 | 5/2016 | Huang et al. |
| 2016/0247581 A1 | 8/2016 | Suzuki et al. |
| 2016/0266791 A1 | 9/2016 | Lin et al. |
| 2016/0371014 A1 | 12/2016 | Roberts |
| 2017/0133107 A1 | 5/2017 | Ryan et al. |
| 2017/0149446 A1 | 5/2017 | Tao et al. |
| 2017/0213597 A1 | 7/2017 | Micheloni |
| 2017/0263311 A1 | 9/2017 | Cometti |
| 2018/0005670 A1 | 1/2018 | Lee et al. |
| 2018/0033490 A1 | 2/2018 | Marelli et al. |
| 2018/0046541 A1 | 2/2018 | Niu et al. |
| 2018/0314586 A1 | 11/2018 | Artieri et al. |
| 2019/0004734 A1* | 1/2019 | Kirshenbaum ....... G06F 3/0679 |
| 2019/0073139 A1 | 3/2019 | Kim et al. |
| 2019/0087119 A1 | 3/2019 | Oh et al. |
| 2019/0095794 A1 | 3/2019 | López et al. |
| 2019/0317901 A1 | 10/2019 | Kachare et al. |
| 2020/0004455 A1 | 1/2020 | Williams et al. |
| 2020/0066361 A1 | 2/2020 | Ioannou et al. |
| 2020/0074269 A1 | 3/2020 | Trygg et al. |
| 2020/0125955 A1 | 4/2020 | Klinger et al. |
| 2020/0151539 A1 | 5/2020 | Oh et al. |
| 2020/0183826 A1 | 6/2020 | Beaudoin et al. |
| 2020/0184245 A1 | 6/2020 | Huang et al. |
| 2020/0185027 A1* | 6/2020 | Rom ..................... G11C 11/54 |
| 2020/0210831 A1 | 7/2020 | Zhang et al. |
| 2020/0401911 A1 | 12/2020 | Zhang et al. |
| 2021/0109673 A1 | 4/2021 | Kim et al. |
| 2021/0118137 A1* | 4/2021 | Shi ........................ G06F 18/214 |
| 2021/0192333 A1 | 6/2021 | Thiruvengadam et al. |
| 2021/0273650 A1* | 9/2021 | Parthasarathy ..... H03M 13/612 |
| 2021/0385012 A1 | 12/2021 | Buethe et al. |
| 2021/0385682 A1* | 12/2021 | Bedekar ............ H04W 28/0215 |
| 2022/0012121 A1 | 1/2022 | Xu et al. |
| 2022/0012572 A1 | 1/2022 | Chen et al. |
| 2022/0027083 A1 | 1/2022 | Zuolo et al. |
| 2022/0050632 A1 | 2/2022 | Hong et al. |
| 2022/0051730 A1 | 2/2022 | Choi et al. |
| 2022/0058488 A1 | 2/2022 | Zuolo et al. |
| 2022/0116056 A1 | 4/2022 | Kaynak et al. |
| 2022/0129738 A1* | 4/2022 | Kale ........................ G06N 3/08 |
| 2022/0165348 A1 | 5/2022 | Zuolo et al. |
| 2022/0188604 A1 | 6/2022 | Zuolo et al. |
| 2022/0270698 A1 | 8/2022 | Zuolo et al. |
| 2022/0329262 A1 | 10/2022 | Liu et al. |
| 2022/0342582 A1 | 10/2022 | Graumann |
| 2022/0365845 A1 | 11/2022 | Buch et al. |
| 2022/0374169 A1 | 11/2022 | Zuolo et al. |
| 2022/0375532 A1 | 11/2022 | Zuolo et al. |
| 2022/0382629 A1 | 12/2022 | Graumann |
| 2022/0383970 A1 | 12/2022 | Zuolo et al. |
| 2022/0416812 A1 | 12/2022 | Wu |
| 2023/0087247 A1 | 3/2023 | Li et al. |

OTHER PUBLICATIONS

U.S. Appl. No. 17/347,388, filed Jun. 14, 2021, Lorenzo Zuolo.
U.S. Appl. No. 17/398,091, filed Aug. 10, 2021, Lorenzo Zuolo.
U.S. Appl. No. 17/506,735, filed Oct. 21, 2021, Lorenzo Zuolo.
J. Mu et al., "The impact of faulty memory bit cells on the decoding of spatially-coupled LDPC codes," 2015 49th Asilomar Conference on Signals, Systems and Computers, Pacific Grove, CA, USA, 2015, pp. 1627-1631, doi: 10.1109/ACSSC .2015.7421423. (Year: 2015).
Noam Shazeer et al: Outrageously Large Neural Networks: The Sparsely-Gated Mixture-of-Experts Layer11, arxiv. org, Cornell University Li Bra Ry, 201 Olin Li Bra Ry Cornell University Ithaca, NY 14853, Jan. 23, 2017.
Yu Cai et al, "Errors in Flash-Memory-Based Solid-State Drives: Analysis, Mitigation, and Recovery" 11 , arxiv. org, Cornell University Library, 201 Olin Library Cornell University Ithaca, NY 14853, Nov. 28, 2017.
PCT/US2021/053279, International Search Report and Written Opinion, European Patent Office, mailed Jan. 31, 2022.

(56) References Cited

OTHER PUBLICATIONS

Santara et al., "BASS Net: Band-Adaptive Spectral-Spatial Feature Learning Neural Network for Hyperspectral Image Classification," in 55.9 IEEE Transactions on Geoscience and Remote Sensing 5293-5301 (2017). (Year: 2017).

Zambelli et al., "Mitigating Self-Heating in Solid State Drives for Industrial Internet-of-Things Edge Gateways," in 9.7 Electronics 1179 (2020). (Year: 2020).

\* cited by examiner

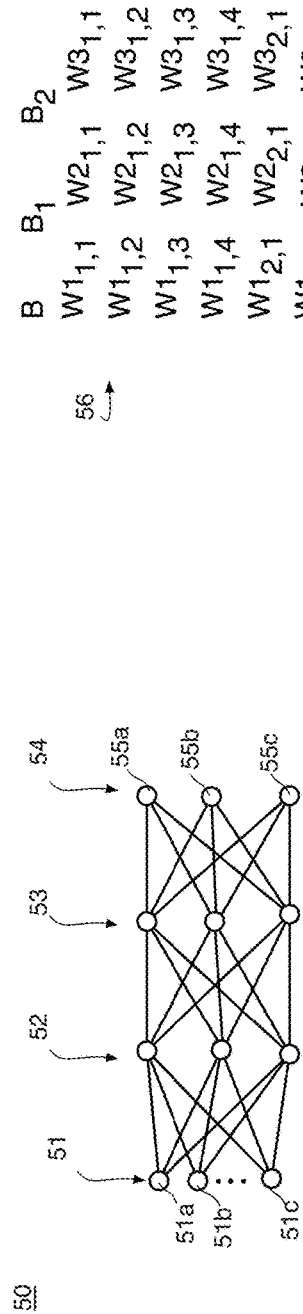
FIG. 3
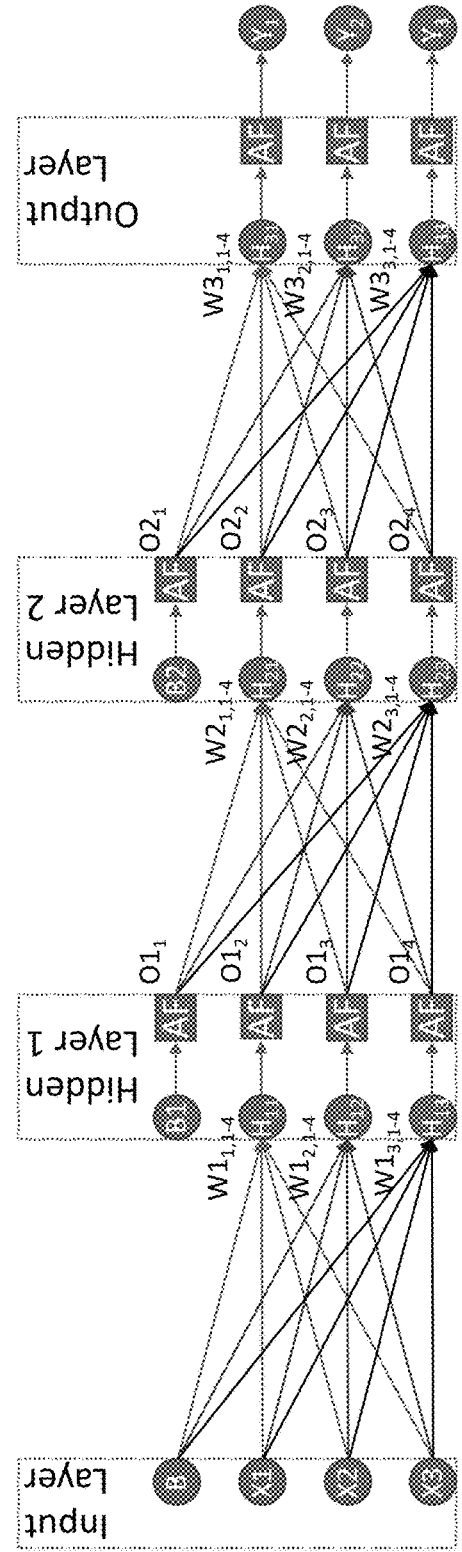
FIG. 4
FIG. 5

METHOD AND APPARATUS FOR PERFORMING A NEURAL NETWORK OPERATION

CROSS-REFERENCE TO RELATED APPLICATIONS

The present application claims priority to U.S. Provisional Patent Application Ser. No. 63/125,966 filed on Dec. 15, 2020, the contents of which are incorporated by reference herein in their entirety.

BACKGROUND OF THE INVENTION

A Deep Neural Network (DNN) is a neural network having more than one hidden layer. Neural network engines that are designed to process DNN's include a plurality of parallel Multiply and Accumulate Circuits (MACs), with one parallel MAC for each layer of the DNN. The parallel MACs are interconnected, with the neurons constituting each layer, and each MAC includes a multiplier and an adder for every neuron in the hidden layers and output layers of the DNN. Within the MAC and extending between MACs for adjoining hidden layers is extensive interconnect logic that includes multiplexers and corresponding interconnects. The number of transistors and connections required for processing DNNs make DNN processes unsuitable for applications in which a single integrated circuit device is required to perform a specific set of operations that are within strict power, thermal and cost envelopes.

One of the applications in which a single integrated circuit device performs a specific set of operations within strict power, size, thermal and cost envelopes is control of flash memory. More particularly, Solid State Drives (SSDs) include flash memory devices that are connected to a flash controller. Client and enterprise class SSDs have strict Uncorrectable Bit Error Rate (UBER) requirements that are becoming increasingly difficult to maintain as the number of bits within each memory cell increases. Though a DNN engine could theoretically be used in a SSD, unfortunately, client and enterprise SSDs have strict power, thermal and cost constraints, making conventional DNN engines unsuitable for such applications.

Accordingly, there is a need for a method and apparatus that will allow for performing DNN operations that is able to operate within strict power, thermal and cost envelopes such as the strict power, thermal and cost envelopes of client and enterprise class SSDs.

SUMMARY OF THE INVENTION

A method for performing a neural network operation includes receiving weight and bias values of a deep neural network (DNN) at an integrated circuit; and coupling an array of feature values, a bias value and a set of weight values for a single layer of the DNN to a neural network engine. Multiply-and-accumulate operations are performed on the single layer of the DNN at one or more multiply and accumulate circuit (MAC) to obtain a sum corresponding to each neuron in the single layer of the DNN. A layer output value corresponding to each neuron in the single layer of the DNN is coupled to a corresponding input of the one or more MAC. Each layer output value consists of one of the sums in the single layer or a function of one of the sums in the single layer. The coupling the bias value and the set of weight values for the single layer of the DNN to the neural network engine, the performing multiply-and-accumulate operations on the single layer of the DNN and the coupling of the layer output value are repeated until multiply-and-accumulate operations have been performed on all layers of the DNN to generate an output-layer-sum corresponding to each output-layer neuron. An activation function is performed on each output-layer-sum to generate one or more DNN output values representing an output layer of the DNN.

An integrated circuit includes an input configured to receive weight and bias values of a deep neural network (DNN); a control module coupled to the input; and a neural network engine coupled to the control module. The control module is configured to send an array of feature values to the neural network engine and to send a bias value for the single layer of the DNN and a set of weight values for a single layer of the DNN to the neural network engine. The neural network engine includes one or more MAC coupled to the control module and configured to receive the array of feature values, the bias value and the set of weight values for the single layer of the DNN. The one or more MAC are configured to perform multiply-and-accumulate operations on the single layer of the DNN to obtain a sum corresponding to each neuron in the single layer of the DNN. A neural network engine controller is coupled to the MAC(s) and is configured to couple a layer output value corresponding to each neuron in the single layer of the DNN to a corresponding input of the one or more MAC. Each layer output value includes one of the sums or a function of one of the sums. One or more activation function module (AFM) is coupled to the one or more MAC. The control module is configured to repeat the coupling of a bias value and a set of weight values for a single layer of the DNN to the neural network engine, and the one or more MAC are configured to repeat the performing multiply-and-accumulate operations on the single layer of the DNN and the neural network engine controller is configured to repeat the coupling of the layer output value to a corresponding input of the one or more MAC until multiply-and-accumulate operations have been performed on all layers of the DNN to generate an output-layer-sum corresponding to each output-layer neuron, and the AFM is configured to perform an activation function on each output-layer-sum to generate one or more DNN output values representing an output layer of the DNN.

A flash controller includes a read module, a status module coupled to the read module, a decode module coupled to the read module and a write module. The flash controller further includes an input configured to receive weight and bias values of a deep neural network (DNN); a control module coupled to the input; and a neural network engine coupled to the control module. The control module is configured to send an array of feature values to the neural network engine and to send a bias value for a single layer of the DNN and a set of weight values for the single layer of the DNN to the neural network engine. The neural network engine includes one or more MAC coupled to the control module and configured to receive the array of feature values, the bias value and the set of weight values for a single layer of the DNN. The one or more MAC are configured to perform multiply-and-accumulate operations on the single layer of the DNN to obtain a sum corresponding to each neuron in the single layer of the DNN. A neural network engine controller is coupled to the one or more MAC and is configured to couple a layer output value corresponding to each neuron in the single layer of the DNN to a corresponding input of the one or more MAC. Each layer output value includes one of the sums or a function of the one of the sums. One or more activation function module is coupled to the one or more MAC. The control module is configured to repeat the coupling of a bias value and a set of weight values for a single layer of the DNN to the neural network engine, and the one or more MAC are configured to repeat the performing multiply-and-accumulate operations on the single layer of the DNN and the neural network engine controller is configured to repeat the coupling of the layer output value to a corresponding input of the one or more MAC until multiply-and-accumulate operations have been performed on all layers of the DNN to generate an output-layer-sum corresponding to each output-layer neuron, and the activation function module is configured to perform an activation function on each output-layer-sum to generate one or more DNN output values representing an output layer of the DNN.

BRIEF DESCRIPTION OF THE DRAWINGS

The accompanying drawings are included to provide a further understanding of the invention, and are incorporated in, and constitute a part of, this specification. The drawings illustrate various examples. The drawings referred to in this brief description are not drawn to scale.

FIG. 3 is a block diagram illustrating a DNN.

FIG. 4 is a diagram illustrating a matrix of weight and bias values for the DNN of FIG. 3.

FIG. 5 is a block diagram illustrating an example of the processing of the DNN of FIG. 3 using the weight and bias values of FIG. 4, and in which activation functions are performed on neuron sums of hidden-layers, hidden-layer bias values, output-layer bias values and on output-layer-neuron sums.

DETAILED DESCRIPTION

Figure 1:
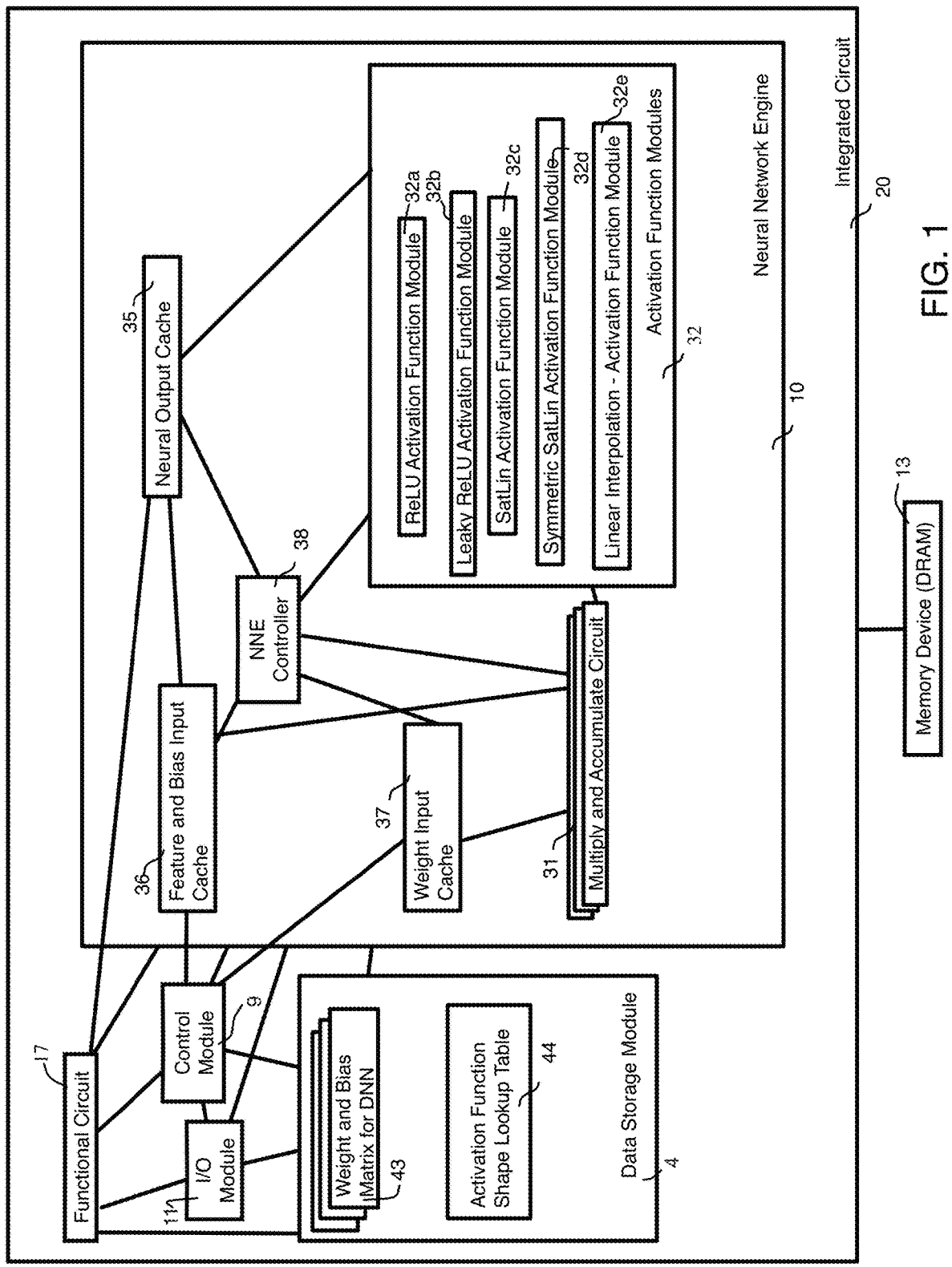
FIG. 1 is a diagram illustrating an integrated circuit including a neural network engine, where the integrated circuit is coupled to a memory device.

FIG. 1 shows an integrated circuit 20 that includes input and output (I/O) module 11, functional circuit 17, data storage module 4, neural network engine 10 and control module 9. Neural network engine 10 is coupled to data storage module 4, to functional circuit 17, to I/O module 11 and control module 9. Data storage module 4 is further coupled to control module 9, functional circuit 17 and I/O module 11. Control module 9 is further coupled to I/O module 11 and functional circuit 17. Functional circuit 17 is further coupled to I/O module 11. Integrated circuit 20 is coupled to memory device 13, which in one example is a dynamic random access memory (DRAM).

Neural network engine 10 includes one or more multiply and accumulate circuit (MAC) 31, activation function modules (AFMs) 32, neural output cache 35, feature and bias input cache 36 (first cache memory), weight input cache 37 (second cache memory) and neural network engine controller 38. The one or more MAC 31 is coupled to AFMs 32, feature and bias input cache 36, weight input cache 37 and neural network engine controller 38. AFMs 32 are coupled to neural output cache 35 and neural network engine controller 38. Neural output cache 35 is further coupled to feature and bias input cache 36, neural network engine controller 38 and functional circuit 17. Feature and bias input cache 36 is further coupled to neural network engine controller 38. Weight input cache 37 is further coupled to neural network engine controller 38 and to control module 9.

AFMs 32 include Rectified Linear Unit (ReLU) AFM 32a configured to perform a ReLU activation function, Leaky ReLU AFM 32b configured to perform a Leaky ReLU activation function, Saturating Linear (SatLin) AFM 32c configured to perform a SatLin activation function, Symmetric SatLin AFM 32d configured to perform a Symmetric SatLin activation function and a linear interpolation module 32e configured to perform a custom activation function. AFMs 32a-32e include hardware circuits configured to perform the respective activation functions.

Figure 2:
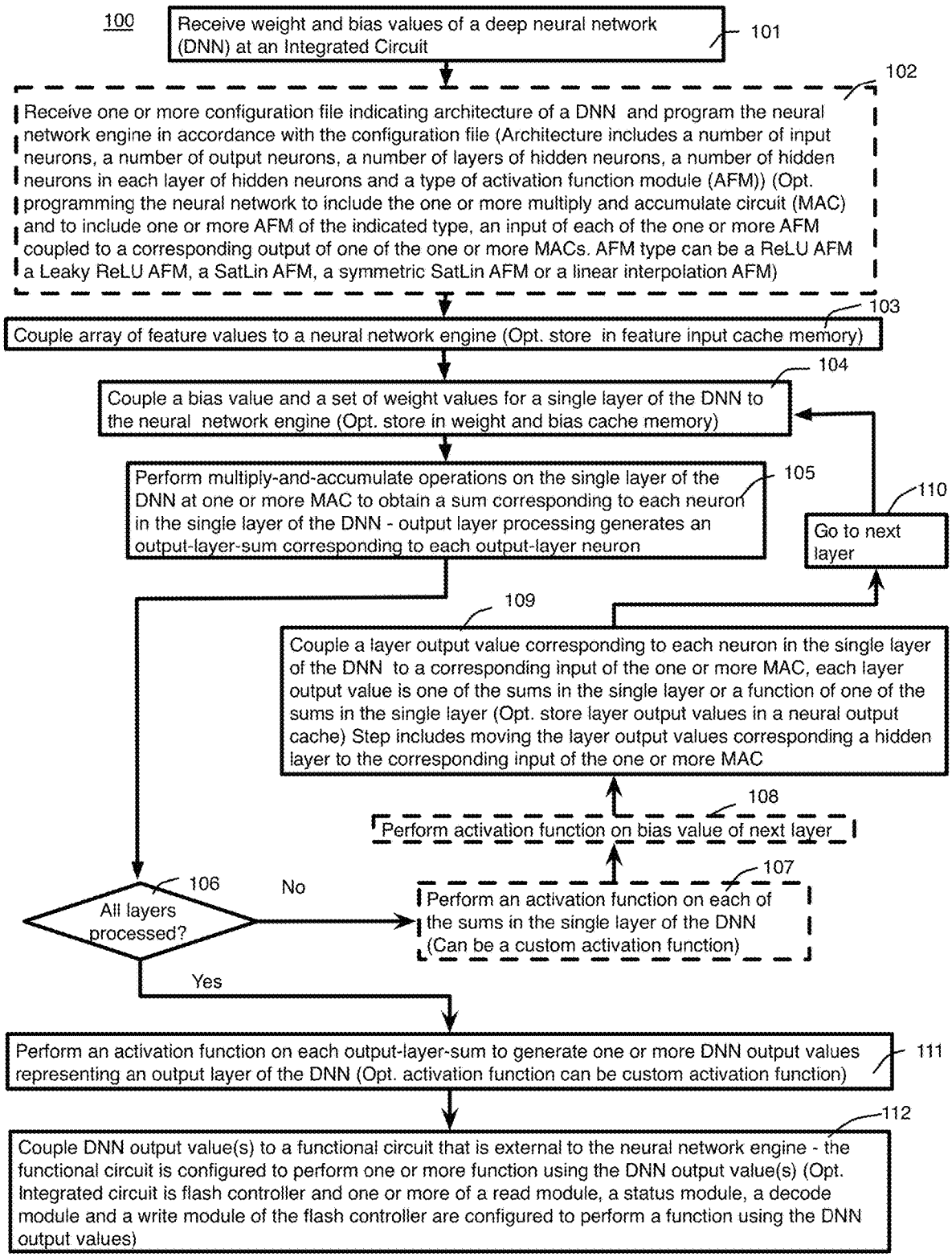
FIG. 2 is a diagram illustrating a method for performing a neural network operation.

A method for performing a neural network operation 100 is illustrated in FIG. 2 that includes receiving weight and bias values of a deep neural network (DNN) (101) at an integrated circuit. In one example, the weigh and bias values are received in one or more matrix. Referring to FIG. 1, an input of I/O module 11 is configured to receive the weight and bias values for all layers of a DNN and data storage module 4 is configured to store the weight and bias values for all layers of the DNN as one or more weight and bias matrix 43 for the DNN. In one example the one or more weight and bias matrix 43 is received at I/O module 11 and is initially stored in a memory device 13 that is external to integrated circuit 20, and portions of the weight and bias values for all layers of the DNN are coupled to the data storage module 4 (or directly into feature and bias input cache 36 and weight input cache 37) as they are needed for performing operations of neural network engine 10.

FIG. 3 illustrates a DNN 50 that includes an input layer 51 that includes input neurons 51a-c, hidden layers 52-53 that include hidden neurons and an output layer 54 that includes output neurons 55a-55c. It is appreciated that DNN 50 is an example and that many other combinations of input layer 51, hidden layers 52-53 and output layer 54 are possible, including layers with different connections between individual neurons, more hidden layers 52-53 and more or fewer neurons in each of the layers 51-54 of DNN 50. For example, though DNN 50 shows each neuron coupled to all of the neurons of the following layer, alternatively, each neuron in a particular layer is coupled to only some of the neurons in the following layer.

FIG. 4 shows an example of a weight and bias matrix 56 that includes a first column that represents a first hidden layer that includes bias value B and first-hidden-layer weight values $W1_{1,1}$-$W1_{3,4}$, a second column that represents weight and bias values for a second hidden layer that includes bias value B1 and second-hidden-layer weight values $W2_{1,1}$-$W2_{3,4}$; and a third column that represents weight and bias values for an output layer that includes bias value B2 and output-layer weight values $W3_{1,1}$-$W3_{3,4}$. Though the present example is a single weight and bias matrix 56, in other examples a first matrix includes all of the bias values for the DNN and a second matrix includes all of the weight values for the DNN. It is appreciated that the weight and bias matrix 56 can also be in the form of any type of ordered set such as an array or a vector, without limitation, and the term weight and bias matrix, as used in the present application includes such forms.

FIG. 5 shows an example in which the bias values and weight values of FIG. 4 are used to perform a neural network operation of DNN 50. In the example of FIG. 5 activation functions (AFs) are performed on bias values of each hidden layer (hidden-layer bias values) and on the output-layer bias value.

When neural network engine 10 includes programmable logic circuits, as shown by optional step 102, one or more configuration file(s) are received that indicate the architecture of the DNN and the neural network is programmed in accordance with the information indicated in the configuration file(s). The configuration file(s) indicate the architecture of the DNN and include an indication of a number of input neurons, a number of output neurons, a number of layers of hidden neurons, a number of hidden neurons in each layer of hidden neurons, and a type of AFM. In one example, the AFM type indicates a type selected from the group consisting of ReLU activation function module 32a, Leaky ReLU activation function module 32b, SatLin activation function module 32c, symmetric SatLin AFM 32d and linear interpolation AFM 32e.

Step 102 optionally includes programming the neural network to include one or more MAC 31 and to include one or more AFMs 32 of the indicated type, an input of each of the one or more AFMs 32 coupled to a corresponding output of one of the one or more MACs 31.

In an example in which DNN 50 of FIG. 3 includes n neurons in each hidden layer of DNN 50, in step 102, neural network engine 10 is configured to include n-parallel MACs 31 that are coupled to n-parallel AFMs 32. When DNN 50 has a different number of neurons in one or more layer, n is the number of neurons in the individual layer of the DNN having the greatest number of neurons. Thus, the value of "n," is the number of neurons in the layer of the DNN having the greatest number of neurons.

Figure 6:
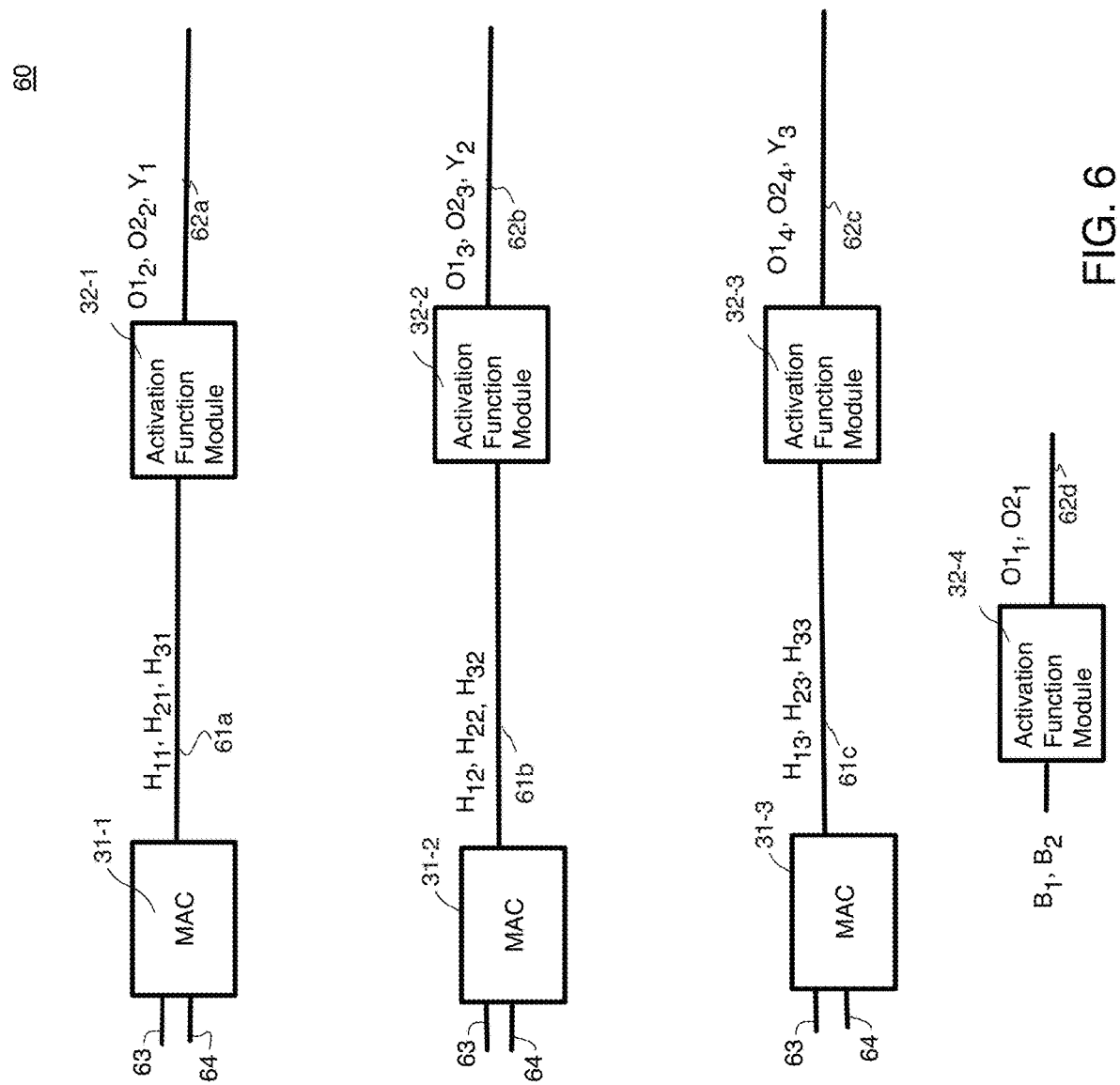
FIG. 6 is a diagram illustrating a portion of a neural network engine that includes a plurality of parallel MACs and a plurality of parallel AFMs.

FIG. 6 illustrates an example of a portion of a neural network engine 10 for a DNN with n neurons in each hidden layer, that has been configured to include n parallel MACs and n activation function modules, where n is 3. More particularly, a portion 60 of neural network engine 10 is shown that has been configured to include a plurality of parallel MAC's 31, illustrated as MACs 31-1, 31-2 and 31-3; and a plurality of parallel AFMs, shown as AFMs 32-1, 32-2 and 32-3. The output of each MAC is coupled to the input of a corresponding AFM. More particularly, the output of MAC 31-1 is coupled to the input of AFM 32-1, the output of MAC 31-2 is coupled to the input of AFM 32-2, and the output of MAC 31-3 is coupled to the input of AFM 32-3.

AFMs 32-1, 32-2 and 32-3 will each be one of types of AFMs 32a-32e shown in FIG. 1. More particularly they will each be dedicated circuits for performing one of a ReLU activation function, a Leaky ReLU activation function, a SatLin activation function, a symmetric SatLin activation function, or a linear interpolation activation function.

An array of feature values is coupled (103) to the neural network engine. In FIG. 1, functional circuits 17 include logic for generating the array of feature values (where the array of feature values relates to a function of the functional circuit 17) and control module 9 is operable to optionally load the array of feature values into feature and bias input cache 36 that is configured to store the array of feature values, or provided directly to MACs 31. Alternatively feature values are received from an external source through I/O module 11 and are coupled from I/O module 11 to neural network engine 10 where they may be optionally stored into feature and bias input cache 36, or provided directly to MACs 31.

A bias value and a set of weight values for a single layer of the DNN are coupled (104) to the neural network engine. Control module 9 is configured to send a bias value and set of weight values for a single layer of the DNN to the neural network engine 10, until sets of weight and bias values for all layers of the DNN have been sent and processed. In one example, control module 9 reads a single row or column of a weight and bias matrix 56 that includes a bias value and weight values for a particular layer and stores the bias value in feature and bias input cache 36 and stores the weight values into weight input cache 37. In some examples, in addition to sending a weight value and bias values for a single layer of the DNN, weight and bias values for more than a single layer are sent at a particular time, with feature and bias input cache 36 and/or weight input cache 37 configured to store the received values until they are needed by MAC 31.

Multiply-and-accumulate operations are performed (105) on the single layer of the DNN at one or more MAC to obtain a sum corresponding to each neuron in the single layer of the DNN. In FIG. 1, neural network engine controller 38 is configured to incrementally step through the registers of feature and bias input cache 36 and to step through the registers of weight input cache 37 to load feature values, bias and weight values into multiply and accumulate circuit 31 as they are required for operation of the one or more MAC 31. The one or more MAC 31 are configured to receive the array of feature values, the bias value and the set of weight values for a single layer of the DNN and are configured to perform multiply-and-accumulate operations on the single layer of the DNN.

Figure 7:
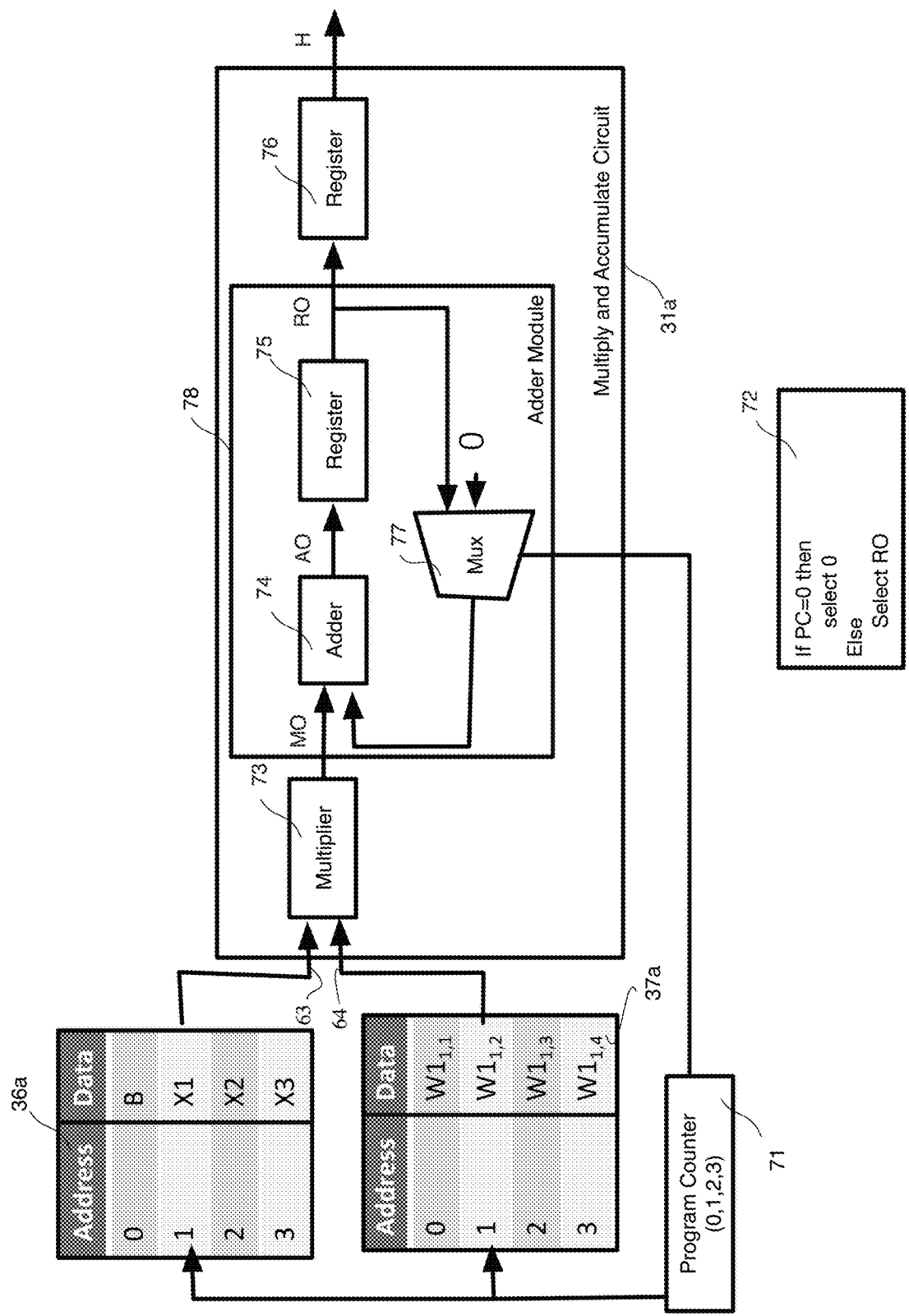
FIG. 7 is a block diagram that shows a portion of a neural network engine, that illustrates a MAC that is coupled to a feature and bias input cache and a weight input cache.

FIG. 7 illustrates an example of a MAC 31a that is coupled to a feature and bias input cache 36a and a weight input cache 37a. In this example neural network engine 10 further includes a program counter 71 and neural network controller 38 includes logic 72 configured to control the operations of MAC 31a. Feature and bias input cache 36a and weight input cache 37a are illustrated as storing values for a DNN in which n is 3. In one example MAC 31-1, 31-2 and 31-3 of FIG. 6 are identical to MAC 31a shown in FIG. 7. MAC 31a includes a multiplier 73, an adder module 78 and a second register 76. Multiplier 73 has a first input 63 coupled to feature and bias input cache 36a and a second input 64 coupled to weight input cache 37a. The multiplier 73 is configured to receive a first bias value and first feature values in the array of feature values at the first input and to receive first-hidden-layer weight values at the second input. The output MO of multiplier 73 is coupled to an input of adder module 78. The adder module 78 includes an adder 74 having a first input coupled to output MO of the multiplier 73, a first register 75 having an input coupled to the output AO of the adder 74 and a multiplexer 77 that includes a first input coupled to the output RO of first register 75 and a second input configured to receive a value of "0". The output of the multiplexer 77 is coupled to a second input of adder 74. Second register 76 that may be referred to as an output register, is coupled to the output RO of first register 75. The output second register 76 is the output of MAC 31*a* and is denoted H.

Neural network engine 10 includes program counter 71 that is coupled to multiplexer 77 and the neural network engine controller 38 is configured, in response to the program counter, to step through the addresses in feature and bias input cache 36*a* and weight input cache 37*a* to load the content of an address in the feature and bias input cache 36*a* into the first input 63 of multiplier 73 and to load the content of an address in the weight input cache 37*a* into the second input 64 of multiplier 73.

It has been found that processing bias values in a manner similar to the processing of neurons allows for the use of the same circuits as are used in the processing of neurons for processing of bias values. This provides for a more simplified design in that there is no need for specialized circuits and/or logic for processing bias values. In one example, each bias value initially has a value of "1" such that, when multiplied by a respective weighting value a product is generated that is equal to the weighting value. Thereby, the respective weighting value (and/or an activation function) determines the bias value to be applied at the particular neuron.

In one example, the bias value and the feature values in the array of feature values are sequentially received at first input 63 of multiplier 73 and first-hidden-layer weight values are sequentially received at second input 64 of the multiplier 73. The first bias value and each of the feature values are multiplied with a corresponding one of the first-hidden-layer weight values to generate a product and the products are added together at the adder module 78 to obtain a first-hidden-layer-sum at output RO of adder module 78. For subsequent layers, the bias value (or a function of the bias value) and the output values of a previous layer are sequentially received at first input 63 of multiplier 73 and corresponding weight values are sequentially received at second input 64 of the multiplier 73. The first bias value (or a function of the bias value) and output values of a previous hidden-layer are multiplied with a corresponding one of the weight values to generate a product; and the products are added together at the adder module 78 to obtain a sum at output RO of adder module 78.

First Hidden Layer MAC Processing Example

An example of processing of the first hidden layer follows. In step 103, X1, X2 and X3 are stored in feature and bias input cache 36. In step 104 a first bias value B is stored in feature and bias input cache 36 and weights $W1_{1,1}$-$W1_{3,4}$ are stored in weight input cache 37. B is received at first input 63 of multiplier 73 (also the first input of each MAC 31) and weights $W1_{1,1}$-$W1_{3,4}$ are received at second input 64 of multiplier 73 (also the second input of each MAC 31). B and each of X1, X2 and X3 are multiplied with a corresponding one of $W1_{1,1}$-$W1_{3,4}$ and the results of the multiplying are added together at the adder module 78 to obtain a first-hidden-layer-sum (e.g. $H_{11}$) at output RO of adder module 78.

More particularly, as shown by block 72, the multiplexer is configured to select a value of zero when the program counter is "0" and to select the output RO at all other values of the program counter so as to pass the output RO of first register 75 to the second input of adder 74. When the program counter is at zero B is multiplied with $W1_{1,1}$ so as to generate output (MO) equal to $W1_{1,1}$, generate the output AO of adder 74, i.e. adder output, equal to $W1_{1,1}$, and store $W1_{1,1}$ in first register 75. The program counter is incremented and X1 is provided to the first input 63 of the multiplier 73 and $W1_{1,2}$ is provided to the second input 64 of multiplier 73, that are multiplied together to produce multiplier 74 output MO that is added to the results from the previous add step (B) in adder 74 to obtain an output $AO=W1_{1,1}+X1*W1_{1,2}$. As the program counter continues to progress through the program steps successive feature values are multiplied with respective first-hidden-layer weight values and summed with previous add-results AO to obtain an output RO representing the first-hidden-layer-sum that is stored in output register 76. In this example, the first-hidden-layer-sum of a first neuron is represented by the equation:

$$H_{11}=B*W1_{1,1}+X1*W1_{1,2}+X2*W1_{1,3}+X3*W1_{1,4}.$$

In the example shown in FIG. 6, MAC 31-1 performs the processing of the first neuron in the first-hidden-layer to generate $H_{11}$ at output 61*a*; MAC 31-2 performs the processing of a second neuron in the first-hidden-layer to generate a second first-hidden-layer-output-sum ($H_{12}$) at output 61*b*; and MAC 31-3 performs the processing of a third neuron in the first-hidden-layer to generate a third first-hidden-layer-output-sum ($H_{13}$) at output 61*c*. First-hidden-layer-sums are calculated for each of the other neurons in the first hidden layer in the same manner as previously discussed with reference to $H_{11}$. In this example, $H_{12}=B*W1_{2,1}+X1*W1_{2,2}+X2*W1_{2,3}+X3*W1_{2,4}$ and $H_{13}=B*W1_{3,1}+X1*W1_{3,2}+X2*W1_{3,3}+X3*W1_{3,4}$, where B values are equal to "1", where $H_{11}$ to $H_{13}$ are seen at the output of output register 76.

End of First Hidden Layer MAC Processing Example

An activation function is optionally performed (107) on each of the sums in the single layer of the DNN. In FIG. 1, for each hidden layer that an activation function is to be performed on, one or more AFM 32 is configured to receive the sums in the particular hidden layer from MAC(s) 31 and to perform an activation function on each sum in the hidden layer to generate hidden-layer output values representing the particular hidden layer of the DNN. AFM 32 is further operable to send the output values for the particular layer to neural output cache 35 where they are stored.

When an activation function is not to be performed on any of the hidden-layers each AFM is configured to pass the sums for the particular layer to the output of the AFM 32, without performing any function on the sums such that the sums for the respective layer are the layer output values. For example, in FIG. 6, the output of MACs 31-1 through 31-3 (e.g., $H_{11}$, $H_{12}$ and $H_{13}$) are each coupled directly from the input of AFM 32-1 to the output of AFM 32-1 as, respectively, layer output values (e.g., $O1_2$, $O1_3$ and $O1_4$).

Optionally an activation function is performed on the bias value of the next layer (108). In the present example, when an activation function is performed on each of the sums in the single layer of the DNN (step 107) an activation function is contemporaneously performed on a bias value for the next layer. In the present example, a dedicated AFM 32 of the same type as the AFM used to perform step 107 is used to generate the function of the bias value for the next layer (e.g. the activation function). When optional step 108 is to be performed, in one example step 104 for the next layer is performed after step 105 (such that the bias value for the current layer is no longer needed) and prior to step 107 (so that the bias value for the next layer is available for contemporaneous processing with step 107).

First Hidden Layer AFM Processing Example

In FIG. 6, AFM 32-1 performs an activation function on $H_{11}$ to generate first hidden layer output $O1_2$ at output 62a of AFM 32-1; AFM 32-2 performs an activation function on $H_{12}$ to generate first hidden layer output $O1_3$ at output 62b of AFM 32-2; and AFM 32-3 performs an activation function on $H_{13}$ to generate first hidden layer output $O1_4$ at output 62c of AFM 32-3. Activation functions may also be performed on bias values. In the present example, neural network engine 10 is configured to include an AFM 32-4 for performing activation functions on one or more bias values. In the present example, AFM 32-4 performs an activation function on B1 to generate first hidden layer output value $O1_1$. The output of each AFM 32-1 to 32-4 (in the first iteration $O1_1$, $O1_2$, $O1_3$ and $O1_4$) is stored in neural output cache 35.

End of First Hidden Layer AFM Processing Example

A layer output value corresponding to each neuron in the single layer of the DNN is coupled (109) to a corresponding input of the one or more MAC, each layer output value consisting of one of the sums in the single layer or a function of one of the sums in the single layer. Neural network engine controller 38 is configured to couple a layer output value corresponding to each neuron in the single layer of the DNN to a corresponding input of the one or more MAC, each layer output value consisting of one of the sums or a function of one of the sums.

At 106 steps 104-110 are repeated until all layers have been processed. More particularly, at 110 the process moves to the next layer. In FIG. 1 control module 9 is configured to repeat the coupling of a bias value and a set of weight values for a single layer of the DNN to the neural network engine 10, the one or more MAC 31 are configured to repeat the performing of the multiply-and-accumulate operations on the single layer of the DNN to obtain a sum corresponding to each neuron in the single layer of the DNN. Neural network engine controller 38 is configured to repeat the coupling of the layer output value to a corresponding input of the one or more MACs and the one or more MACs 31 are configured to perform multiply-and-accumulate operations, until multiply-and-accumulate operations have been performed on all layers of the DNN to generate an output-layer-sum corresponding to each output-layer neuron.

In one example, neural output cache 35 is a small cache and each set of output values following the first-hidden-layer output values overwrites a previous set of hidden-layer output values stored in neural output cache 35. Feature and bias input cache 36 is also a small cache, and after the processing of the first hidden layer, each time that control module 9 stores a bias value (or a function of a bias value) and a set of output values, it overwrites previously stored values in feature and bias input cache 36. Similarly, weight input cache 37 is a small cache and, after the storing first-hidden-layer weight values, each subsequent time that control module 9 stores a set of weight values it overwrites a set of weight values previously stored in weight input cache 37. In this example step 109 includes storing a copy of the contents of the neural output cache 35 in the feature and bias input cache, overwriting the feature values or the output values of a previous layer in the neural output cache 35 and further includes moving the layer output values corresponding to a hidden layer to the corresponding input of the one or more MAC.

Second hidden Layer and Output Layer Processing Example

In step 104 a second bias value B1 and second-hidden-layer weight values $W2_{1,1}$-$W2_{3,4}$ are coupled to neural network engine 10

In step 105 multiply and accumulate operations are performed. In one example, a first-hidden-layer output value corresponding to each neuron in the first hidden layer is coupled to a corresponding input of the one or more MAC. In FIG. 6, first-hidden-layer output values $O1_2$, $O1_3$ and $O1_4$ are coupled to the first input of each MAC along with $O1_1$ obtained by performing an activation function on B1.

The second bias value or a function of the second bias value and the first-hidden-layer output values are received at first input 63 of multiplier 73 and second-hidden-layer weight values are received at second input 64 of the multiplier 73. The second bias value or the function of the second bias value and each of the first-hidden-layer output values are multiplied with a corresponding one of the second-hidden-layer weight values and the results of the multiplying are added together at the adder module 78 to obtain a second-hidden-layer-sum at an output RO of adder module 78. More particularly, as shown by block 72, the multiplexer is configured to select a value of zero when the program counter is "0" and to select the first input at all other values of the program counter so as to pass the output of register 75 (RO) to the second input of adder 74. When the program counter is at "0" $O1_1$ is multiplied with $W2_{1,1}$ so as to generate multiplier output (MO) equal to $O1_1$ $W2_{1,1}$, generate adder output (AO) at the output of adder 74 equal to $O1_1$ $W2_{1,1}$, and store $O1_1$ $W2_{1,1}$ in first register 75. The program counter is incremented and $O1_2$ is provided to the first input of the multiplier 73 and $W2_{1,2}$ is provided to the second input of multiplier 73, that are multiplied together to produce multiplier output MO that is added to the results from the previous add step ($O1_1$) in adder 74 to obtain an output AO=$O1_1$ $W2_{1,1}$+$O1_2$ $W2_{1,2}$. As the program counter continues to progress through the program steps successive first-hidden-layer output values are multiplied with respective second-hidden-layer weight values and summed with previous add-results AO to obtain an output RO representing the second hidden layer sum that is stored in output register 76. In this example, the second-hidden-layer-sum of a first neuron is represented by the equation $H_{21}$=$O1_1$*$W2_{1,1}$+$O1_2$*$W2_{1,2}$+$O1_3$*$W2_{1,3}$+$O1_4$*$W2_{1,4}$, where $H_{21}$ is seen at the output of output register 76.

Second-hidden-layer-sums $H_{22}$ and $H_{23}$ are calculated for each of the other neurons in the first hidden layer in the same manner as previously discussed with reference to $H_{11}$. In this example, $H_{22}$=$O1_1$*$W2_{2,1}$+$O1_2$*$W2_{1,2}$+$O1_3$*$W2_{2,3}$+$O1_4$*$W2_{2,4}$ and $H_{23}$=$O1_1$*$W2_{3,1}$+$O1_2$*$W2_{3,2}$+$O1_3$*$W2_{3,3}$+$O1_4$*$W2_{3,4}$. In the example shown in FIG. 6 the first hidden layer, MAC 31-1 performs the processing of the first neuron in the second-hidden-layer to generate $H_{21}$ at output 61a; MAC 31-2 performs the processing of a second neuron in the first-hidden-layer to generate a second-hidden-layer-output-sum ($H_{22}$) at output 61b; and MAC 31-3 performs the processing of a third neuron in the second-hidden-layer to generate a second-hidden-layer-output-sum ($H_{23}$) at output 61c.

Continuing with FIG. 6, AFM 32-1 performs an activation function on $H_{21}$ to generate second hidden layer output $O2_2$ at output 62a of AFM 32-1; AFM 32-2 performs an activation function on $H_{22}$ to generate second hidden layer output $O2_3$ at output 62b of AFM 32-2; and AFM 32-3 performs an activation function on $H_{23}$ to generate second hidden layer output $O2_4$ at output 62c of AFM 32-3. AFM 32-4 performs an activation function on B2 to generate function of bias value B2 ($O2_1$) at AFM output 62d. $O2_2$, $O2_3$, $O2_4$ and $O2_1$ are stored in neural output cache 35, overwriting the stored first-hidden-layer output values previously stored in neural output cache 35.

Steps 109, 110 and 104-106 are repeated until all hidden layers have been processed to generate output values of the last hidden layer at step 105 or optionally 107.

In the present example, the output layer is the third layer of the DNN. In this example, step 109 includes coupling output-layer bias value B2 and output layer weight values $W3_{1,1}$-$W3_{3,4}$ to the neural network engine (104) by storing $O2_1$, $O2_2$, $O2_3$, $O2_4$ in feature and bias input cache 36 and storing $W3_{1,1}$-$W3_{3,4}$ in weight input cache 37. In step 108 AFM 32-4 performs an activation function on B2 to generate second hidden layer output value $O2_1$. In step 105 multiply and accumulate operations are performed by coupling $O2_1$ and a last-hidden-layer output value corresponding to each neuron in the last hidden layer ($O2_2$, $O2_3$, $O2_4$) to a corresponding input of the one or more MAC. In FIG. 6, a copy of $O2_1$, $O2_2$, $O2_3$, $O2_4$ from neural output cache 35 are stored in feature and bias input cache 36 and are received at a first input of multiplier 73 of each parallel MAC 31-1, 31-2 and 31-3. Output-layer weight values $W3_{1,1}$-$W3_{3,4}$ are received at a second input 64 of each parallel MAC 31-1, 31-2 and 31-3. $O2_1$, $O2_2$, $O2_3$, $O2_4$ are multiplied with a corresponding one of $W3_{1,1}$-$W3_{3,4}$ and the products of the multiplying are added together at the adder module 78 to obtain output-layer sum $H_{31}$ at the output of MAC 31-1, output-layer sum $H_{32}$ at the output of MAC 31-2 and output-layer sum $H_{33}$ at the output of MAC 31-3. In this example, $H_{31}=O2_1*W3_{1,1}+O2_2*W3_{1,2}+O2_3*W3_{1,3}+O2_4*W3_{1,4}$; $H_{32}=O2_1*W3_{2,1}+O2_2*W3_{2,2}+O2_3*W3_{2,3}+O2_4*W3_{2,4}$ and $H_{33}=O2_1*W3_{3,1}+O2_2*W3_{3,2}+O2_3*W3_{3,3}+O1_4*W3_{3,4}$.

End of Second Hidden Layer and Output Layer Processing Example

An activation function is performed (111) on each output-layer-sum to generate one or more DNN output values representing an output layer of the DNN. In FIG. 1, AFMs 32 are operable to perform the activation function on each output-layer-sum to generate a corresponding DNN output value. AFMs 32 are then operable to send the DNN output values to neural output cache 35 where they are stored.

In FIG. 6, AFM 32-1 performs an activation function on $H_{31}$ to generate DNN output value $Y_1$ at output 62a of AFM 32-1; AFM 32-2 performs an activation function on $H_{32}$ to generate DNN output value $Y_2$ at output 62b of AFM 32-2; and AFM 32-3 performs an activation function on $H_{33}$ to generate DNN output value $Y_3$ at output 62c of AFM 32-3. $Y_1$, $Y_2$ and $Y_3$ are stored in neural output cache 35, overwriting the stored second-hidden-layer output values previously stored in neural output cache 35.

In the examples discussed with reference to FIG. 6, n parallel MACs are used to performing multiply-and-accumulate operations on the single layer of the DNN, where each of the n MACs are operable to generate a sum corresponding to one of the neurons in the single layer of the DNN. However, alternatively, less than n parallel MACs could be used, with processing of sums corresponding to neurons in the single layer of the DNN performed serially.

Figure 8:
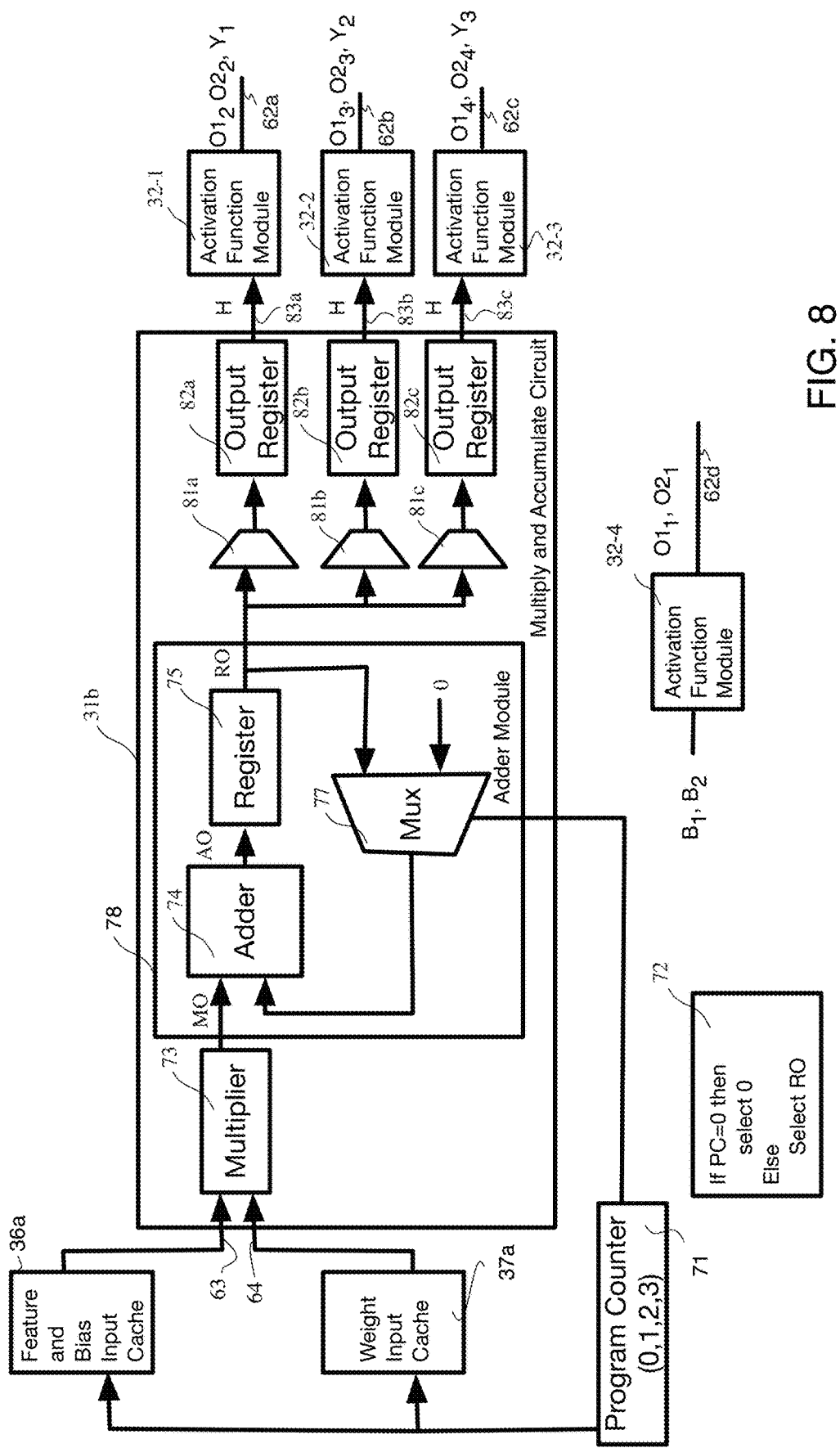
FIG. 8 is a block diagram illustrating a portion of a neural network engine, that illustrates a single MAC that includes multiple outputs, each of the outputs coupled to one or a plurality of parallel activation function modules.

In one example that is illustrated in FIG. 8 the multiply-and-accumulate operations of step 105 of FIG. 2 are performed at a single MAC 31b to obtain a sum corresponding to each neuron in the single layer of the DNN, each sum corresponding to the neuron in the single layer of the DNN stored in a corresponding one of a plurality of output registers 82a-82c of the single MAC 31b.

MAC 31b is coupled to a feature and bias input cache 36a and a weight input cache 37a. In this example neural network engine 10 further includes a program counter 71 and neural network controller 38 includes logic 72 configured to control the operations of MAC 31b and only a single MAC 31b is required to perform method 100 of FIG. 1. MAC 31b includes a multiplier 73 having a first input 63 coupled to feature and bias input cache 36a and a second input 64 coupled to weight input cache 37a. Multiplier 73 is configured to receive a bias value (or a function of a bias value) and feature values (or output values of a previous hidden layer) at the first input 63 and to receive weight values at the second input 64. The output of multiplier 73 is coupled to an input of an adder module 78. The adder module 78 includes an adder 74 having a first input coupled to an output MO of the multiplier 73, a first register 75 having an input coupled to the output AO of the adder 74; and a multiplexer 77 that includes a first input coupled to the output RO of register 75 and a second input configured to receive a value of "0". The output of multiplexer 77 is coupled to a second input of adder 74.

MAC 31b includes a plurality of output multiplexers 81a-81c coupled to the output RO of first register 75 and a plurality of output registers 82a-82c that are coupled to the output of respective ones of output multiplexers 81a-81c. More particularly, the output RO of first register 75 is coupled to the input of each of output multiplexers 81a-81c and the output of output multiplexer 81a is coupled to the input of output register 82a that generates output H at 83a, the output of output multiplexer 81b is coupled to the input of output register 82b that generates output H at 83b; and the output of output multiplexer 81c is coupled to the input of output register 82c that generates output H at 83c. The outputs of output registers 82a-82c form the outputs of MAC 31b. Output 83a is coupled to the input of AFM 32-1, output 83b is coupled to the input of AFM 32-2 and output 83c is coupled to the input of AFM 32-3.

Multiplier 73 and adder module 78 in FIG. 8 operate in the same manner as discussed with reference to FIG. 7 to generate sums corresponding to each hidden neuron and each output neuron. However, instead of generating the sums in parallel, output sums are generated serially, and as each sum is generated it is coupled to output multiplexers 81a-c, with one or output multiplexers 81a-c being selected each time that a sum is generated so that the generated sum is stored in the corresponding output register 82a-82c.

Example Using a Single DNN

In the example of FIGS. 3-5, the bias value (or a function of the bias value) and the feature values in the array of feature values (or a hidden layer output values of a previous layer) are received at first input 63 and corresponding weight values are received at second input 64. Each received input at the first input 63 is multiplied with a respective input received at second input 64 to generate a corresponding product, i.e. multiplier output MO, and the products are added together at the adder module 78 to obtain a layer-sum at output RO of adder module 78. Each generated layer-sum for a particular layer is coupled to, and stored in, a different one of output registers 82a-82c by the operation of multiplexers 81a-81c.

In the processing of the first hidden layer the bias value and the feature values are multiplied with corresponding ones of the first-hidden-layer weight values to obtain products MO that are added together at the adder module 78 to generate $H_{11}$. Neural network engine controller 38 includes logic to select output multiplexer 81a such that $H_{11}$ is stored in output register 82a. The first bias value and each of the feature values are multiplied with a corresponding one of the first-hidden-layer weight values and the results of the multiplying are added together at the adder module 78 to obtain a first-hidden-layer-sum $H_{12}$ at output RO of adder module 78. Neural network engine controller 38 includes logic to select output multiplexer 81b such that the $H_{12}$ is stored in register 82b. The first bias value and each of the feature values are multiplied with a corresponding one of the first-hidden-layer weight values and the results of the multiplying are added together at the adder module 78 to obtain a first-hidden-layer-sum $H_{13}$ at output RO of adder module 78. Neural network engine controller 38 includes logic to select output multiplexer 81c such that the $H_{13}$ is stored in register 82c.

Once all neuron sums for a particular layer are generated and stored in registers 82a-82c, the outputs of each of the neurons for the particular layer are coupled in parallel to AFMs 32-1 through 32-3 and activation function processing is performed in the same manner as previously discussed in FIG. 6. More particularly in the example of FIGS. 3-5, AFM 32-1 performs an activation function on $H_{11}$ to generate first hidden layer output $O1_2$ at output 62b; AFM 32-2 performs an activation function on $H_{12}$ to generate first hidden layer output $O1_3$ at output 62b; and AFM 32-3 performs an activation function on $H_{13}$ to generate first hidden layer output $O1_4$ at output 62c.

The second hidden layer is processed in the same manner as the first hidden layer except for the use of layer output values instead of feature values. More particularly, the second-hidden-layer bias value or a function of the second hidden layer bias value and the first-hidden-layer output values are multiplied with corresponding ones of the second-hidden-layer weight values to obtain products MO that are added together at the adder module 78 to generate $H_{21}$. Neural network engine controller 38 includes logic to select output multiplexer 81a such that $H_{21}$ is stored in output register 82a. The second bias value or a function of the second bias value and each of the first-hidden-layer output values are multiplied with a corresponding one of the second-hidden-layer weight values and the results of the multiplying are added together at the adder module 78 to obtain $H_{22}$ at output RO of adder module 78. Neural network engine controller 38 includes logic to select output multiplexer 81b such that $H_{22}$ is stored in register 82b. The second bias value or a function of the second bias value ($O1_1$) and each of the first-hidden-layer output values are multiplied with a corresponding one of the second-hidden-layer weight values and the results of the multiplying are added together at the adder module 78 to obtain a second-hidden-layer-sum $H_{23}$ at output RO of adder module 78. Neural network engine controller 38 includes logic to select output multiplexer 81c such that the $H_{23}$ is stored in register 82c.

AFM 32-1 performs an activation function on $H_{21}$ to generate second hidden layer output $O2_2$ at output 62a of AFM 32-1; AFM 32-2 performs an activation function on $H_{22}$ to generate second hidden layer output $O2_3$ at output 62b of AFM 32-2; and AFM 32-3 performs an activation function on $H_{23}$ to generate second hidden layer output $O2_4$ at output 62c of AFM 32-3. AFM 32-4 performs an activation function on B1 to obtain function of bias value B1 ($O2_1$).

$O2_2$, $O2_3$, $O2_4$ and $O2_1$ are stored in neural output cache 35, overwriting the stored first-hidden-layer output values previously stored in neural output cache 35.

The output layer multiply- and accumulate operations are performed in the same manner as the second hidden layer to generate output-layer-sums $H_{31}$, $H_{32}$ and $H_{33}$. AFM 32-1 performs an activation function on $H_{31}$ to generate DNN output $Y_1$ at output 62a; AFM 32-2 performs an activation function on $H_{32}$ to generate DNN output $Y_2$ at output 62b; and AFM 32-3 performs an activation function on $H_{33}$ to generate DNN output $Y_3$ at output 62c.

$Y_1$, $Y_2$ and $Y_3$ are stored in neural output cache 35, overwriting the stored second-hidden-layer output values previously stored in neural output cache 35.

End of First Example Using Single DNN

Referring back to FIG. 1, the DNN output value(s) are coupled (112) to a functional circuit 17 of the integrated circuit 20 that is external to the neural network engine. The functional circuit 17 is configured to perform one or more function using the DNN output value(s). In one example, functional circuit 17 is configured to read the output values (e.g., O1, O2 and O3 stored in neural output cache 35) and to perform one or more function using the DNN output value(s). In. one example functional circuit 17 is operable to generate arrays of feature values that relate to the function of functional circuit 17. In one example, integrated circuit 20 is flash controller and one or more of a read module, a status module, a decode module and a write module of the flash controller are configured to perform a function using the DNN output values.

In some applications there is a need to perform nonlinear activation functions that cannot be easily implemented using dedicated hardware circuits such as hardware circuits implementing AFMs 32a-32d. In FIG. 1, integrated circuit 20 allows a user to specify their own custom activation function and input the custom activation function through I/O module 11 as a file or other data structure that indicates the shape of the desired function (e.g., in the form of x and y coordinates that indicate the desired shape). Alternatively, functional circuit 17 can generate the custom activation function. In one example, in optional step 102 of FIG. 1 neural network engine 10 is configured to include linear interpolation-AFM 39e.

Figure 9:
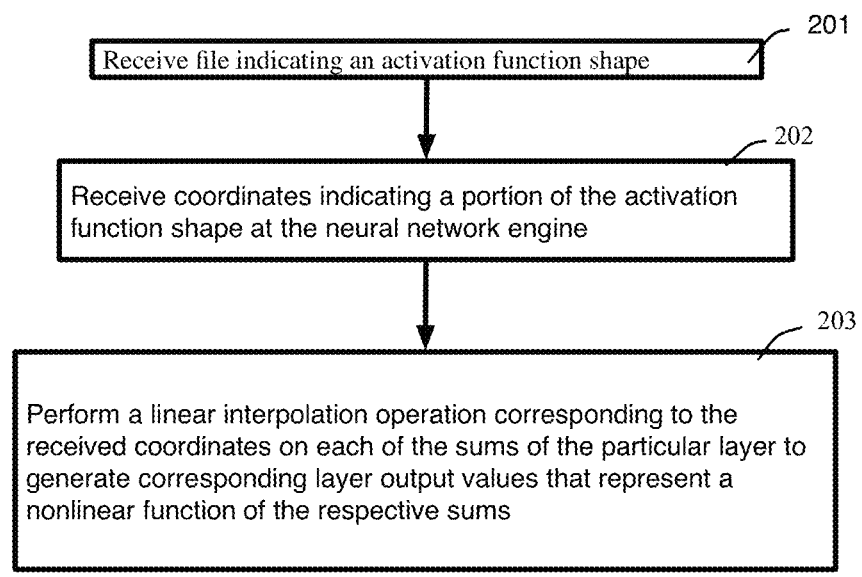
FIG. 9 is a diagram illustrating a method for performing a custom activation function.

FIG. 9 illustrates a method 200 for performing a custom activation function. Optionally, one or more file indicating an activation function shape is received (201). In FIG. 1, the activation function shape file is received at the input of I/O module 11, and stored in data storage module 4. In the present example, the file is an activation function shape lookup table 44 that is stored in data storage module 4 or in memory device 13.

Figure 11:
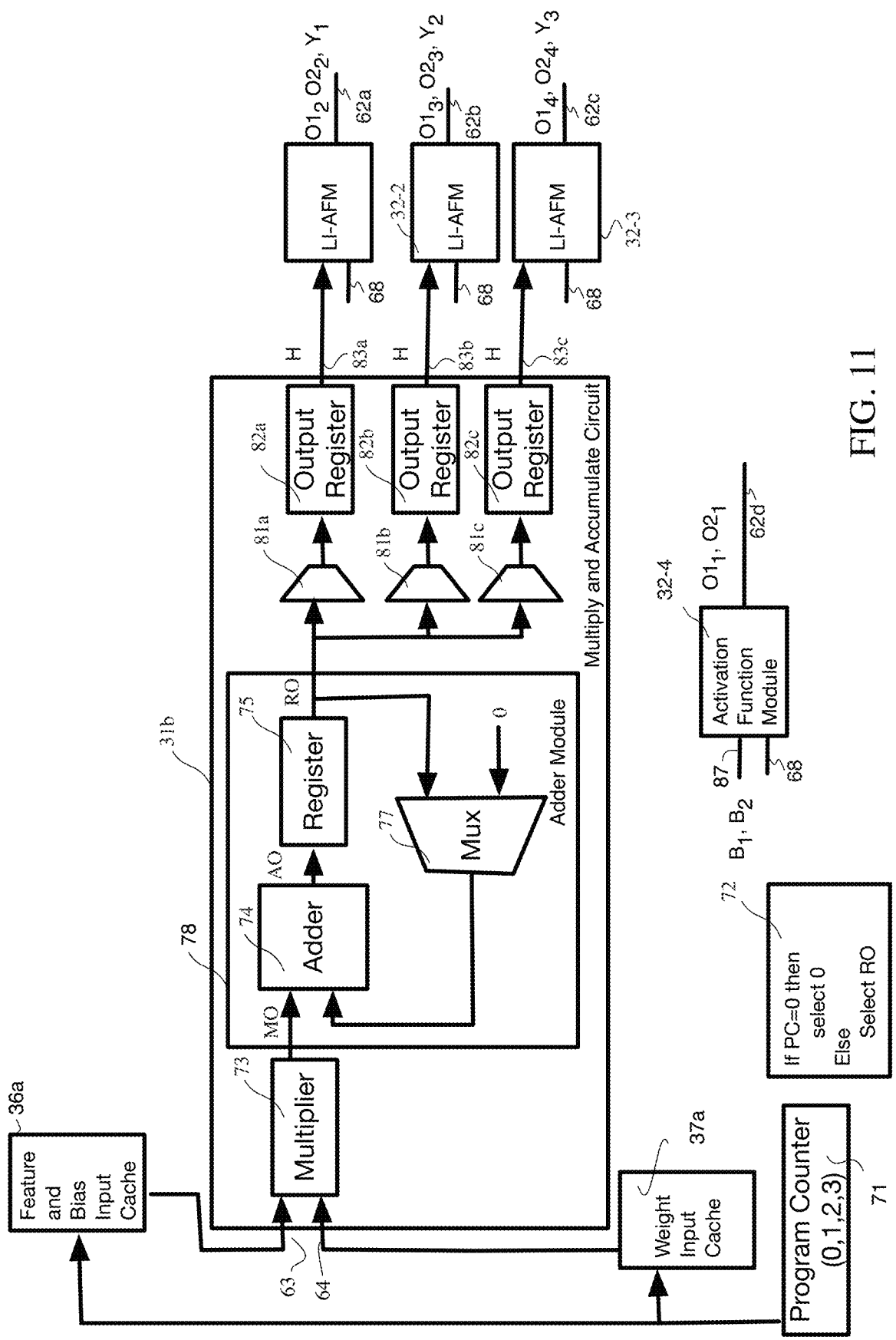
FIG. 11 is a block diagram illustrating a portion of a neural network engine, that illustrates a single MAC that includes multiple outputs, each of the outputs coupled to one or a plurality of linear interpolation activation function modules.

Optionally, coordinates indicating a portion of the activation function shape are received (202) at the neural network engine 10. In FIG. 11, coordinates indicating an activation function shape are received at linear interpolation AFM 32e. Linear interpolation AFM 32e of FIG. 1 is a hardware, software or firmware module configured to receive coordinates indicating a portion of an activation function shape (e.g., adjoining pairs of x and y coordinates from function from activation shape lookup table 44).

Figure 10:
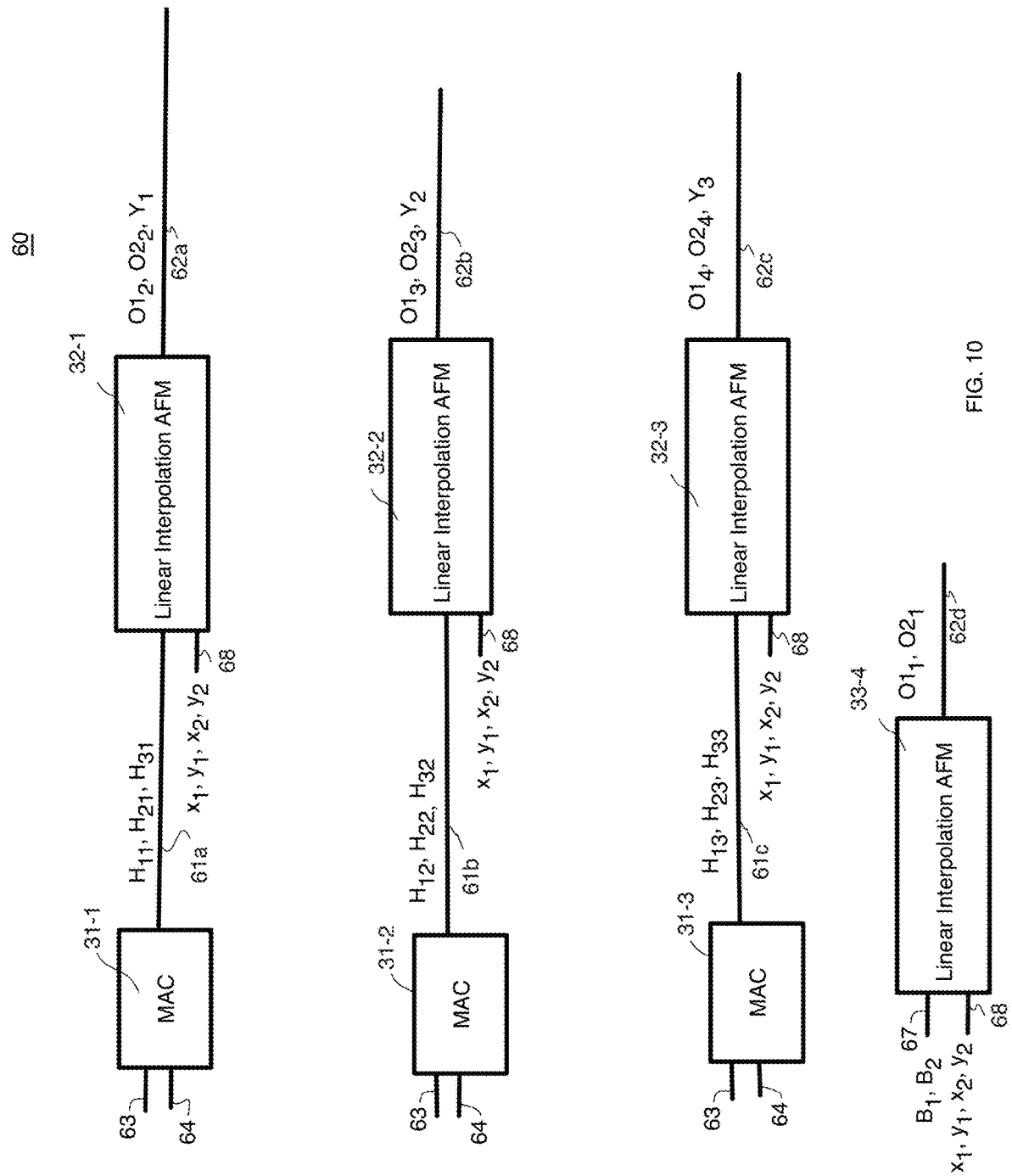
FIG. 10 is a block diagram illustrating a portion of a neural network engine, that illustrates a single MAC that includes multiple outputs, each of the outputs coupled to one or a plurality of parallel linear interpolation activation function modules.

FIG. 10 shows an example that is identical to FIG. 6 except that AFM-32-1, AFM 32-2 and AFM 32-3 are linear interpolation AFMs. FIG. 11 shows an example that is identical to FIG. 8 except that AFM-32-1, AFM 32-2 and AFM 32-3 are linear interpolation AFMs (LI-AFM). When each AFM-32-1, AFM 32-2 and AFM 32-3 is a linear interpolation AFMs, it will have a second input 68 configured to receive coordinates indicating a portion of an activation function shape, shown as x1, y1, x2, y2. In step 202 coordinates indicating an activation function shape are received at second input 68.

A linear interpolation operation is performed (203) corresponding to the received coordinates on each of the sums of the particular layer of the DNN to generate corresponding layer output values that represent a nonlinear function of the respective sums. In one example, NNE controller 38 is configured to identify adjoining pairs of x and y coordinates from activation function shape lookup table 44 and couple them to input 68 of AFM-32-1, AFM 32-2 and AFM 32-3. AFM-32-1, AFM 32-2 and AFM 32-3 are configured to perform an activation function on input received at the first input (e.g., inputs 61a-61c and 67 of FIG. 10 or 83a-83c and 87 of FIG. 11) of the linear interpolation AFM that corresponds to a straight line between the pairs of x and y coordinates received at the first input to generate an output at the output of each linear interpolation module 32e that is a nonlinear function of the input received at the first input of each linear interpolation module AFM-32-1, AFM 32-2 and AFM 32-3.

When a custom activation function is performed on the output layer in step 203, a linear interpolation operation is performed corresponding to the received coordinates on each output-layer-sum to generate the one or more DNN output values. The custom activation function can be any linear or nonlinear activation function that can be approximated or represented by means of a linear interpolation operation.

Figure 12:
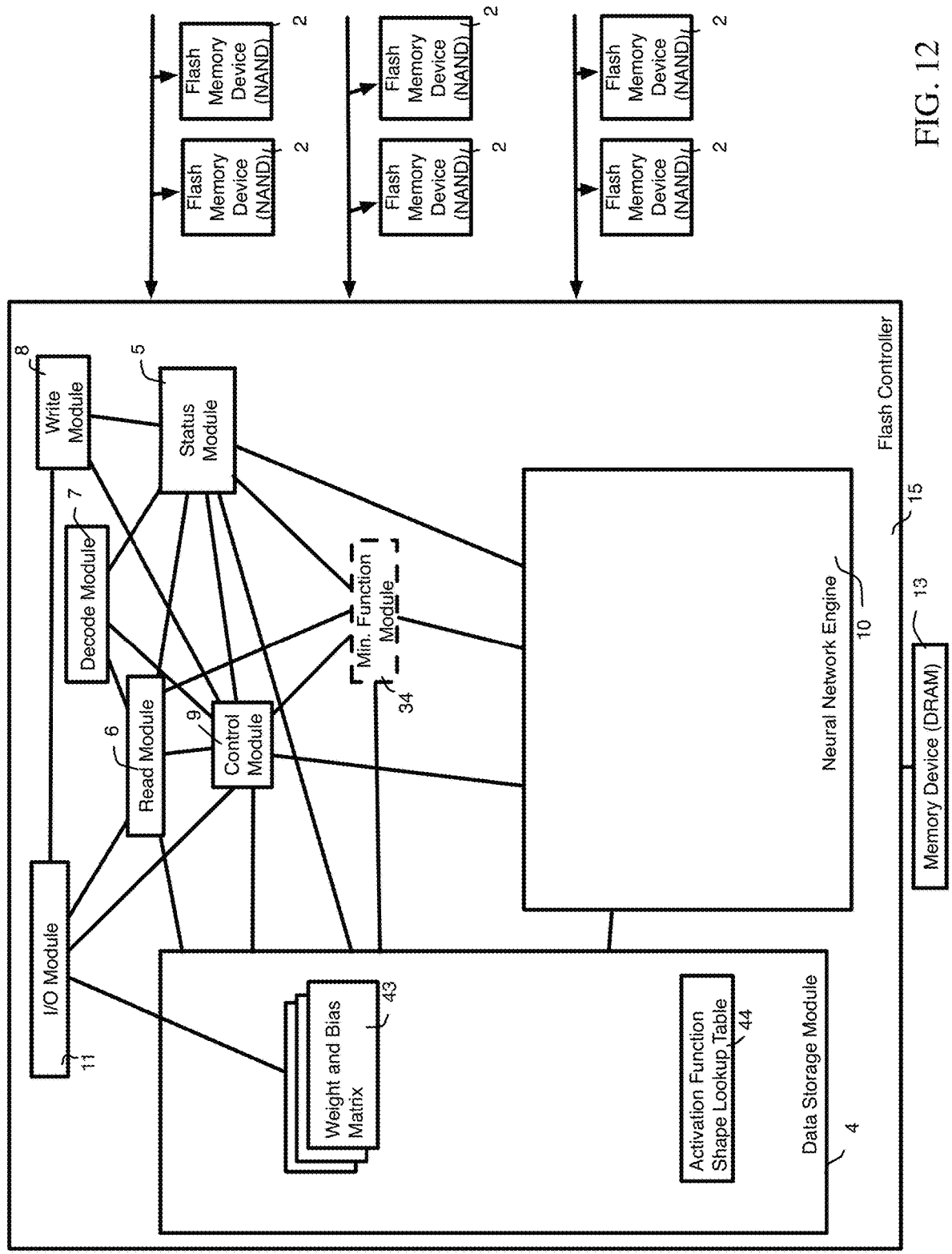
FIG. 12 is a diagram illustrating a flash memory controller including a neural network engine, where the flash memory controller is coupled to flash memory devices and to a memory device.

FIG. 12 illustrates an embodiment in which the functional circuits perform flash memory control operations and in which the integrated circuit device is a flash controller. More particularly, a flash controller 15 is shown that includes a status module 5 configured to identify a current number of program and erase (P/E) cycles and an I/O module 11 having an input configured to receive weight and bias values of a DNN. In one example, I/O module 11 is configured to receive one or more files including all of the weight and bias values for a DNN.

Neural network engine 10 shown in FIG. 3 is the same as the neural network engine 10 shown in FIG. 1 and is configured to perform methods 100 and 200 of FIGS. 2 and 10.

Threshold-voltage-shift reads are performed by sending a threshold-voltage-shift read instruction to a flash memory device that is to be read. One or more Threshold-Voltage-Shift Offset (TVSO) value are sent with the threshold-voltage-shift read instruction. The TVSO value indicates the amount by which each threshold voltage that is used to perform the read is to be offset from a corresponding default threshold voltage that is specified by the manufacturer of the flash memory device. Multi-level cell (MLC) flash memory devices store two bits of information in each cell and require three TVSO values for each read, triple level cell (TLC) flash memory devices store three bits of information in each cell and require seven TVSO values for each read; quad level cell (QLC) flash memory devices store four bits of information in each cell and require 15 TVSO values for each read; and penta level cell (PLC) flash memory devices store five bits of information in each cell and require 31 TVSO values for each read.

Flash controller 15 is coupled to a plurality of flash memory devices 2 for storing data and for reading data using threshold voltage shift reads of flash memory devices 2. In one example, the flash memory devices 2 are NAND devices and flash controller 15, flash memory devices 2 and memory device 13 are mounted to a circuit board (not shown). Memory device 13 is a volatile memory device such as a Dynamic Random Access Memory (DRAM) that is electrically coupled to flash controller 15.

Flash controller 15 is configured to receive read and write instructions from a host computer, and to perform program operations, erase operations and read operations on memory cells of flash memory devices 2 to complete the instructions from the host computer. For example, upon receiving a write instruction from a host computer, flash controller 15 is operable to program codewords into on one or more of flash memory devices 2.

Flash controller 15 includes data storage module 4, status module 5, read module 6, decode module 7, write module 8, control module 9, neural network engine 10, minimum function module 34 and input and output (I/O) module 11. Control module 9 is coupled to data storage module 4, status module 5, read module 6, decode module 7, write module 8, neural network engine 10 and input and output (I/O) module 11. Decode module 7 is further coupled to data storage 4, read module 6 and to status module 5. Status module 5 is further coupled to data storage module 4, read module 6, write module 8, control module 9 and neural network engine 10. Read module 6 is further coupled to data storage module 4, neural network engine 10, decode module 7 and minimum function module 34. Minimum function module 34 is further coupled to data storage module 4, status module 5, read module 6, control module 9 and neural network engine 10. Neural network engine 10 is further coupled to data storage module 4. Input and output (I/O) module 11 is further coupled to data storage module 4, read module 6, and write module 8.

Some or all of modules 5-11, include circuits that are dedicated circuits for performing operations, and some or all of modules 4-11 can be firmware that includes instructions that are performed on one or more processor for performing operations of flash controller 15, with the instructions stored in registers of one or more of modules 5-11 and/or stored in data storage module 4 or memory device 13. Some of all of modules 5-11 include processors for performing instructions and instructions are loaded into flash controller 15 prior to operation of flash controller 15.

One or more of read module 6, status module 5, decode module 7 and write module 8 are configured to perform a function using the DNN output values.

In one example, a first DNN 50 is a reliability-state Classification Neural Network (CNN) model. The term "reliability-state CNN model," as used in the present application, includes all classification neural network models configured to predict a reliability state. In this example the weight and bias matrix 43 includes weight and bias values of a reliability-state DNN that generates DNN output values indicating a predicted reliability state of a flash memory device 2. In one example, the reliability-state CNN model is generated and neural network operations are performed as shown in U.S. Non-Provisional patent application Ser. No. 17/213,675 filed on Mar. 26, 2021 that is titled "Method and apparatus for determining when actual wear of a flash memory device differs from reliability states for the flash memory device," that is incorporated by reference herein in its entirety.

In one example, a second DNN 50 is a regression DNN and the weight and bias matrix 43 includes weight and bias values of the regression DNN, that generates DNN output values predicting the shape of a threshold-voltage-shift read-error (TVS-RE) curve (e.g., coefficients of a TVS-RE curve, where the identified TVSO value is proximate a minimum value of the TVS-RE curve). In one example, the RNN inference model is generated and neural network operations are performed as shown in U.S. Non-Provisional patent application Ser. No. 17/089,891, filed on Nov. 5, 2020, having the title "Regression Neural Network for Identifying Threshold Voltages to be Used in Reads of Flash Memory Devices," that is incorporated by reference herein in its entirety. In one example, minimum function module 34 operable to identify the TVSO value corresponding to a minimum value of the TVS-RE curve (TVSOmin) using the output of an inference operation performed using neural network 10 and is further operable to send the identified TVSOmin value read module 6. Read module 6 is operable to perform reads of flash memory devices 2 using the identified TVSO value.

Neural network engine 10 includes fewer multipliers and adders as compared to conventional neural network engines that have a multiplier and adder corresponding to each neuron in the DNN. Accordingly, neural network engine 10 has reduced size, power and cost as compared to conventional neural network engines that have a multiplier and adder corresponding to each neuron in the DNN and corresponding connection logic.

In the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What is claimed is:

1. A method for performing a neural network operation at a flash controller integrated circuit comprising:
    receiving one or more configuration files at the flash controller integrated circuit, the received one or more configuration files indicating a number of input neurons, a number of output neurons, a number of layers of hidden neurons, a number of hidden neurons in each layer of hidden neurons, and a type of activation function module;
    programming a neural network engine of the flash controller integrated circuit in accordance with the information indicated in the one or more configuration files, the neural network engine programmed to include one or more multiply and accumulate circuits (MAC$) and to include one or more activation function modules of the indicated type, an input of a respective one of the one or more activation function modules coupled to an output of a respective one of the one or more MACs, the neural network engine programmed to include MAC and activation function modules to define a classification neural network (CNN) and a regression deep neural network (DNN);
    receiving weight and bias values for the CNN at the flash controller integrated circuit;
    monitoring the operation of a flash memory device comprising a flash memory die coupled to the flash controller integrated circuit at a status module of flash controller integrated circuit to identify feature values relating to the flash memory device, the feature values including a number program and erase (P/E) values for the flash memory device;
    coupling a first array of feature values to the neural network engine of the flash controller integrated circuit, the feature values in the first array of feature values relating to a predicted reliability state of the flash memory device and including at least some of the identified feature values corresponding to the flash memory device;
    coupling a bias value for a single layer of the CNN and a set of weight values for the single layer of the CNN to the neural network engine of the flash controller integrated circuit;
    performing multiply-and-accumulate operations on the single layer of the CNN at the one or more MACs to obtain a sum corresponding to each neuron in the single layer of the CNN;
    coupling a layer output value corresponding to each neuron in the single layer of the CNN to a corresponding input of the one or more MACs, each layer output value comprising one of the sums in the single layer or a function of one of the sums in the single layer;
    repeating the coupling the bias value and the set of weight values for the single layer of the CNN to the neural network engine, the performing multiply-and-accumulate operations on the single layer of the CNN and the coupling the layer output value until multiply-and-accumulate operations have been performed on all layers of the CNN to generate an output-layer-sum corresponding to each output-layer neuron;
    performing an activation function on each output-layer-sum using a respective activation function module of the plurality of activation function modules to generate one or more CNN output values representing an output layer of the CNN, the one or more CNN output values indicating a predicted reliability state of the flash memory device;
    coupling a second array of feature values and weight and bias values of the regression DNN to the neural network engine of the flash controller integrated circuit, the second array of feature values including at least some of the identified feature values corresponding to the flash memory device;
    performing neural network operations of the regression DNN to generate regression neural network (RNN) output values predicting the shape of respective threshold-voltage-shift read-error (TVS-RE) curves;
    coupling the one or more RNN output values to one or more functional circuits of the flash controller integrated circuit that are external to the neural network engine of the flash controller integrated circuit, the one or more functional circuits including a read module, the one or more functional circuits to identify respective threshold voltage shift offset (TVSO) values proximate a minimum value of respective TVS-RE curves; and
    sending one or more threshold-voltage-shift read instructions and respective TVSO values from the read module to the flash memory device, for reading the flash memory device.

2. The method of claim 1 comprising:
    receiving a file indicating an activation function shape; and
    receiving coordinates indicating a portion of the activation function shape at the neural network engine,
    wherein the performing an activation function comprises performing a linear activation function corresponding to the received coordinates on each of the sums of the particular layer to generate corresponding layer output values that represent a nonlinear function of the respective output-layer-sums.

3. The method of claim 1 further comprising:
    receiving a file indicating an activation function shape; and receiving coordinates indicating a portion of the activation function shape at the neural network engine, wherein the performing an activation function on each output-layer-sum further comprises performing a linear interpolation operation corresponding to the received coordinates on each output-layer-sum to generate the one or more CNN output values.

4. The method of claim 1 wherein the activation function module type indicates a type selected from the group consisting of a Rectified Linear Unit (ReLU) activation function module, a Leaky ReLU activation function module, a Saturating Linear (SatLin) activation function module, a symmetric SatLin activation function module and a linear interpolation activation function module.

5. The method of claim 1 comprising:
wherein coupling the first array of feature values to the neural network engine further comprises storing the array of feature values in a first cache memory,
wherein coupling the bias value and the set of weight values for the single layer of the CNN to the neural network engine comprises storing the bias value and the set of weight values for the single layer of the CNN in a second cache memory, and
wherein coupling the layer output value to the corresponding input of the one or more MACs comprises storing layer output values corresponding to a hidden layer of the CNN in a cache memory and moving the layer output values corresponding to the hidden layer to the corresponding input of the one or more MACs, the moving comprising storing a copy of the layer output values, corresponding to the hidden layer of the CNN stored in the neural output cache, into the feature and bias input cache, by overwriting previously stored values in the feature and bias input cache.

6. A flash controller integrated circuit comprising:
an input to receive weight and bias values of a classification neural network (CNN) and a regression deep neural network (DNN);
a control module coupled to the input;
function circuits for performing flash memory control operations, the function circuits include a write module for programming codewords into a flash memory device that includes a flash memory die external to the flash controller integrated circuit, include a read module to perform reads of the flash memory device using Threshold Voltage Shift Offset (TVSO) values include a decode module to decode the results of the reads and include a status module to monitor the operation of the flash memory device to identify feature values relating to the flash memory device, the feature values including a number of program and erase (P/E) values for the flash memory device;
a neural network engine coupled to the control module, the control module to send aa first array of feature values to the neural network engine and to send a bias value and set of weight values for a single layer of the CNN to the neural network engine, wherein at least some of the feature values in the first array of feature values are the feature values identified by the status module, the neural network engine comprising:
one or more multiply and accumulate circuits (MACs) coupled to the control module, the one or more MACs to receive the array of feature values, the bias value and the set of weight values for a single layer of the CNN, the one or more MACs to perform multiply-and-accumulate operations on the single layer of the CNN to obtain a sum corresponding to each neuron in the single layer of the CNN;
a neural network engine controller coupled to the one or more MACs, the neural network engine controller to couple a layer output value corresponding to each neuron in the single layer of the CNN to a corresponding input of the one or more MACs, where each layer output value includes of one of the sums or a function of the one of the sums; and
one or more activation function module coupled to the one or more MACs,
wherein the control module is to repeat the coupling the bias value and the set of weight values, the one or more MACs are to repeat the performing multiply-and-accumulate operations and the neural network engine controller is to repeat the coupling the layer output value to the corresponding input of the one or more MAC until multiply-and-accumulate operations have been performed on all layers of the CNN to generate an output-layer-sum corresponding to each output-layer neuron,
wherein the activation function module is to perform an activation function on each output-layer-sum to generate one or more CNN output values representing an output layer of the CNN, the one or more CNN output values indicating a predicted reliability state of a flash memory device,
wherein the control module is to couple a second array of feature values and weight and bias values oh the regression DNN to the neural network engine of the flash controller integrated circuit, the second array of feature values including at least some of the identified feature values corresponding to the flash memory device, the neural network engine to perform neural network operations of the regression DNN to generate regression neural network (RNN) output values predicting the shape of respective threshold-voltage-shift read-error (TYS-RE) curves,
wherein the TVSO values used to perform the reads are TVSO values proximate a minimum value of respective TVS-RE curves.

7. The integrated circuit of claim 6 wherein the control module is coupled to the MAC through one or more cache memory.

8. The integrated circuit of claim 6 wherein the neural network engine comprises:
a feature and bias input cache coupled to the control module and the one or more MACs;
a weight input cache coupled to the control module and to the one or more MACs; and
a neural output cache coupled to the outputs of the one or more activation function modules and coupled to the neural network engine controller, the neural output cache to store layer output values corresponding to each hidden layer of the CNN and the one or more CNN output values,
wherein the coupling of each sum to the corresponding input of the one or more MACs comprises storing a copy of the contents of the neural output cache in the feature and bias input cache.

9. The integrated circuit of claim 6 wherein the activation function module comprises a linear interpolation module coupled to the one or more MAC's, the linear interpolation module to receive coordinates indicating a portion of an activation function shape and perform a linear interpolation operation corresponding to the received coordinates on each of the sums of the particular layer of the DNN to generate corresponding layer output values that represent a nonlinear function of the respective sums.

10. The integrated circuit of claim 6 wherein the activation function module performs an activation function selected from the group consisting of a Rectified Linear Unit (ReLU) activation function, a Leaky ReLU activation function, a Saturating Linear (SatLin) activation function, a symmetric SatLin activation module and a linear interpolation activation function module.

* * * * *